United States Patent
Wang et al.

(10) Patent No.: US 12,218,587 B2
(45) Date of Patent: Feb. 4, 2025

(54) SYSTEMS AND METHODS FOR CONTROLLING OPERATION MODES OF DC-TO-DC VOLTAGE CONVERTERS

(71) Applicant: ON-BRIGHT ELECTRONICS (SHANGHAI) CO., LTD., Shanghai (CN)

(72) Inventors: Fagang Wang, Shanghai (CN); Qiang Luo, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 366 days.

(21) Appl. No.: 17/555,397

(22) Filed: Dec. 18, 2021

(65) Prior Publication Data

US 2022/0209663 A1  Jun. 30, 2022

(30) Foreign Application Priority Data

Dec. 25, 2020 (CN) .......................... 202011568796.2

(51) Int. Cl.
*H02M 3/155* (2006.01)
*H02M 1/00* (2006.01)
*H02M 1/08* (2006.01)

(52) U.S. Cl.
CPC ......... *H02M 3/155* (2013.01); *H02M 1/0009* (2021.05); *H02M 1/08* (2013.01)

(58) Field of Classification Search
CPC .. H02M 3/155; H02M 3/1582; H02M 1/0009; H02M 7/4815; H02M 1/007
See application file for complete search history.

(56) References Cited

U.S. PATENT DOCUMENTS 8,018,212 B1  9/2011  Petricek
8,664,982 B2  3/2014  Chen et al.
(Continued)

FOREIGN PATENT DOCUMENTS

CN  203135724 U  8/2013
CN  103546033 A  1/2014
(Continued)

OTHER PUBLICATIONS

Taiwan Intellectual Property Office, Office Action issued Feb. 11, 2022, in Application No. 110111410.
(Continued)

*Primary Examiner* — Kyle J Moody
(74) *Attorney, Agent, or Firm* — Faegre Drinker Biddle & Reath LLP

(57) ABSTRACT

Voltage converter and method for converting an input voltage to an output voltage. For example, a voltage converter for converting an input voltage to an output voltage includes: a coil; multiple switches including one or more switches connected to the coil; a modulation signal generator configured to: receive the output voltage and one or more detection signals indicating a magnitude of a coil current flowing through the coil; and generate a first signal and a second signal based at least in part upon the output voltage and the one or more detection signals; and an operation mode controller configured to: receive the input voltage, the output voltage, the first signal, and the second signal; and generate one or more mode signals based at least in part upon the input voltage, the output voltage, the first signal, and the second signal.

31 Claims, 19 Drawing Sheets

(56) References Cited

U.S. PATENT DOCUMENTS

| | | | |
|---|---|---|---|
| 9,831,780 | B2 | 11/2017 | Hong et al. |
| 2007/0296389 | A1 | 12/2007 | Chen et al. |
| 2008/0303502 | A1 | 12/2008 | Haiplik |
| 2009/0160416 | A1 | 6/2009 | Kawagishi et al. |
| 2010/0164563 | A1 | 7/2010 | Bea et al. |
| 2011/0187336 | A1 | 8/2011 | Wu et al. |
| 2011/0241636 | A1* | 10/2011 | Wu .............. H02M 3/1584 323/272 |
| 2011/0279098 | A1 | 11/2011 | Ren et al. |
| 2013/0328534 | A1 | 12/2013 | Hsieh |
| 2014/0159686 | A1 | 6/2014 | Lee et al. |
| 2015/0069958 | A1 | 3/2015 | Yang et al. |
| 2018/0152105 | A1 | 5/2018 | Ohyama et al. |
| 2019/0190280 | A1 | 6/2019 | Chen et al. |
| 2019/0302818 | A1 | 10/2019 | Liu et al. |
| 2019/0305666 | A1* | 10/2019 | Yang .............. H02M 1/0009 |
| 2020/0274444 | A1 | 8/2020 | Li |
| 2023/0049903 | A1 | 2/2023 | Wang et al. |

FOREIGN PATENT DOCUMENTS

| | | |
|---|---|---|
| CN | 104092374 A | 10/2014 |
| CN | 105518968 A | 4/2016 |
| CN | 205583749 U | 9/2016 |
| CN | 111262435 A | 6/2020 |
| CN | 111610815 A | 9/2020 |
| CN | 112019048 A | 12/2020 |
| JP | 2006-033958 A | 2/2006 |
| JP | 2018-078533 A | 5/2018 |
| TW | 201301733 A | 1/2013 |
| TW | 201351861 A | 12/2013 |
| TW | 201539954 A | 10/2015 |

OTHER PUBLICATIONS

Taiwan Intellectual Property Office, Office Action issued May 27, 2022, in Application No. 110114689.
Liu et al., "External ramp autotuning for current mode control of switching converters", 2013 Twenty-Eighth Annual IEEE Applied Power Electronics Conference and Exposition (APEC), 2013, pp. 276-280.
China Patent Office, Office Action issued Feb. 6, 2024, in Application No. 202011568796.2.
China Patent Office, Office Action issued May 18, 2023, in Application No. 202110918107.4.
Liu, Pei-Hsin, "External Ramp Autotuning for Current Mode Control of Switching Converters," 2013 28th Annual IEEE Applied Power Electronics Conference and Exposition (APEC), 2013, pp. 276-280.
United States Patent and Trademark Office, Office Action issued Apr. 25, 2024, in U.S. Appl. No. 17/885,099.
United States Patent and Trademark Office, Notice of Allowance issued Sep. 19, 2024, in U.S. Appl. No. 17/885,099.

* cited by examiner

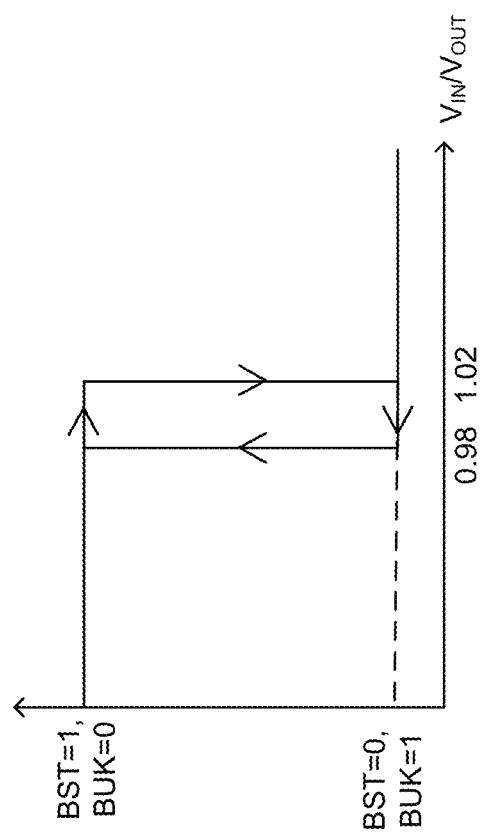

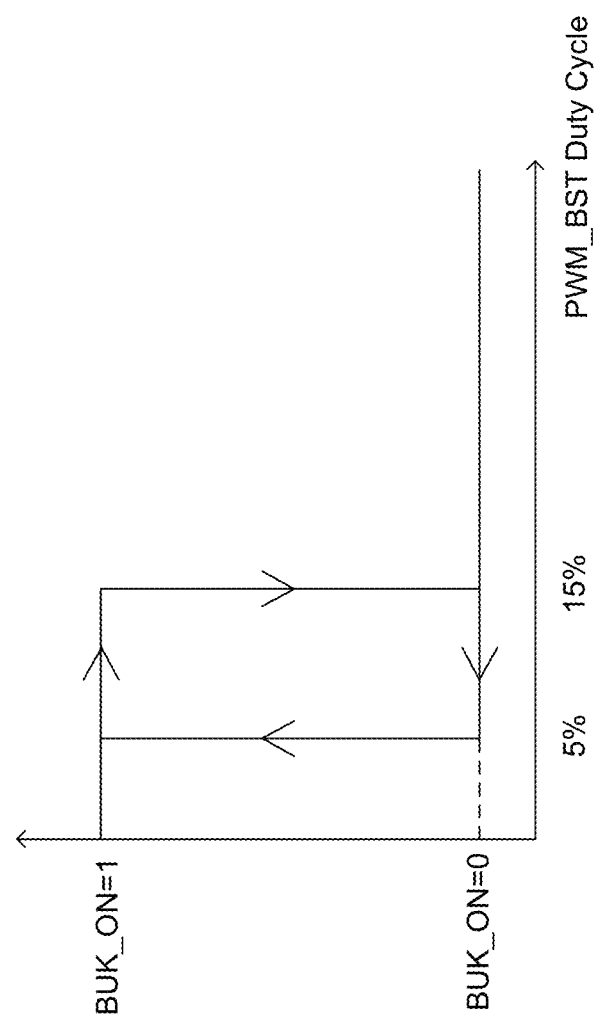

SYSTEMS AND METHODS FOR CONTROLLING OPERATION MODES OF DC-TO-DC VOLTAGE CONVERTERS

1. CROSS-REFERENCES TO RELATED APPLICATIONS

This application claims priority to Chinese Patent Application No. 202011568796.2, filed Dec. 25, 2020, incorporated by reference herein for all purposes.

2. BACKGROUND OF THE INVENTION

Certain embodiments of the present invention are directed to circuits. More particularly, some embodiments of the invention provide systems and methods for controlling operation modes of DC-to-DC voltage converters. Merely by way of example, some embodiments of the invention have been applied to buck-boost converters. But it would be recognized that the invention has a much broader range of applicability.

A conventional wireless charging system often includes a power transmitter and a power receiver. The power transmitter usually receives a Direct Current (DC) voltage from a power supply. For example, the DC voltage is provided by a power adapter, a battery, or a Universal Serial Bus (USB) port. In response, the power transmitter converts the DC voltage to an Alternate Current (AC) voltage. Additionally, the power transmitter includes a coil that is coupled with another coil of the power receiver. Through the coupling, the power receiver receives an AC voltage from the power transmitter and converts the AC voltage to a DC voltage, which is used to charge a device. Currently, the wireless charging is being extended to certain high-power applications, such as charging a tablet and/or a laptop.

Usually, the power transmitter receives the DC voltage from the power supply as an input voltage and generates an output voltage (e.g., a bus voltage) that is to be converted to the AC voltage for transmission. When the power transmitter is used to charge a full load through the power receiver, the output voltage often is increased to a maximum value in order to provide a maximum power. In contrast, when the power transmitter is at standby without being used for charging, the output voltage often is reduced to a minimum value in order to lower the standby power consumption. Therefore, the capability to satisfy various power requirements with different input voltages is usually important for the power transmitter. For example, for a 30-watt wireless charger, the power transmitter receives a 12-volt input voltage from a power adapter, but the output voltage needs to be adjusted between 3 volts and 20 volts depending on various power requirements. Hence the ability to achieve a proper matching between the input voltage and the output voltage is often important.

Conventionally, the power transmitter includes an internal voltage adapter to raise or lower the input voltage in order to generate the output voltage that is desirable for certain operation condition. FIG. 1 is a simplified diagram showing a conventional power transmitter of a wireless charging system. The power transmitter 100 includes a DC-to-DC voltage converter 110, a wireless power controller 120, and a full-bridge LC resonant circuit 130. As shown in FIG. 1, the wireless power controller 120 generates control signals 122 and 124. The control signal 122 is received by the DC-to-DC voltage converter 110, and the control signal 124 is received by the full-bridge LC resonant circuit 130. The DC-to-DC voltage converter 110 receives an input voltage 112 (e.g., $V_{IN}$). In response to the control signal 122, the DC-to-DC voltage converter 110 uses the input voltage 112 (e.g., $V_{IN}$) to generate an output voltage 114 (e.g., $V_{OUT}$). The input voltage 112 (e.g., $V_{IN}$) and the output voltage 114 (e.g., $V_{OUT}$) both are DC voltages, whose magnitudes satisfy a desirable matching relationship. Additionally, the output voltage 114 (e.g., $V_{OUT}$) is received by the full-bridge LC resonant circuit 130. The full-bridge LC resonant circuit 130 includes a coil 140 that is coupled to another coil of a power receiver as part of the wireless charging system. In some examples, the input voltage 112 (e.g., $V_{IN}$) is provided through a USB port from a power adapter, a 12-volt power source on an automobile, and/or a portable power bank. In certain examples, the output voltage 114 (e.g., $V_{OUT}$) is higher than, equal to, or lower than the input voltage 112 (e.g., $V_{IN}$). For example, the output voltage 114 (e.g., $V_{OUT}$) ranges from 5 volts to 20 volts depending on the desirable power level. As an example, a maximum power level of the power transmitter 100 is 100 watts.

FIG. 2 is a simplified diagram showing an example of the conventional DC-to-DC voltage converter 110 of the power transmitter 100 as shown in FIG. 1. The DC-to-DC voltage converter 110 includes a switch 212 (e.g., switch A), a switch 214 (e.g., switch B), a switch 216 (e.g., switch C), a switch 218 (e.g., switch D), capacitors 222 and 224, and a coil 230. The coil 230 and the coil 140 are two separate coils. As shown in FIG. 2, one terminal of the switch 212 (e.g., switch A) and one terminal of the capacitor 222 are both connected to an input terminal 240, which receives the input voltage 112 (e.g., $V_{IN}$). Additionally, one terminal of the switch 218 (e.g., switch D) and one terminal of the capacitor 224 are both connected to an output terminal 242, which outputs the output voltage 114 (e.g., $V_{OUT}$).

During a time duration, the switch 212 (e.g., switch A) and the switch 216 (e.g., switch C) are closed but the switch 214 (e.g., switch B) and the switch 218 (e.g., switch D) are open so that the input voltage 112 (e.g., $V_{IN}$) at the input terminal 240 is used to store energy in the coil 230. During another time duration, the switch 214 (e.g., switch B) and the switch 218 (e.g., switch D) are closed but the switch 212 (e.g., switch A) and the switch 216 (e.g., switch C) are open so that the coil 230 provides energy to the output terminal 242. As shown in FIG. 2, the DC-to-DC voltage converter 110 performs in-phase voltage conversion, and the output voltage 114 (e.g., $V_{OUT}$) can be larger than, equal to, or smaller than the input voltage 112 (e.g., $V_{IN}$).

FIG. 3 shows a simplified timing diagram for the conventional DC-to-DC voltage converter 110 of the power transmitter 100 as shown in FIG. 2. The waveform 300 represents a magnitude of a coil current (e.g., $I_L$) that flows through the coil 230 as a function of time. From time $t_1$ to time $t_2$, the switch 212 (e.g., switch A) and the switch 216 (e.g., switch C) are closed but the switch 214 (e.g., switch B) and the switch 218 (e.g., switch D) are open, and the magnitude of the coil current (e.g., $I_L$) increases with time. From time t2 to time t3, the switch 214 (e.g., switch B) and the switch 218 (e.g., switch D) are closed but the switch 212 (e.g., switch A) and the switch 216 (e.g., switch C) are open, and the magnitude of the coil current (e.g., $I_L$) decreases with time. The entire time duration from time $t_1$ to time $t_3$ corresponds to one switching cycle, and the average magnitude of the coil current (e.g., $I_L$) is equal to the average magnitude of the coil current (e.g., $I_L$) from time $t_1$ to time $t_3$.

As shown in FIG. 3, the conventional DC-to-DC voltage converter 110 of the power transmitter 100 does not allow the switch 212 (e.g., switch A) and the switch 218 (e.g., switch D) to be both closed at the same time. As an example, the coil 230 provides energy to the output terminal 242 only when the switch 214 (e.g., switch B) and the switch 218 (e.g., switch D) are closed and the switch 212 (e.g., switch A) and the switch 216 (e.g., switch C) are open. Hence, under certain load conditions, the average magnitude of the coil current (e.g., $I_L$) is large, causing the switch conduction loss to increase and also causing the coil DC resistance loss to increase.

FIG. 4 is a simplified diagram showing another example of the conventional DC-to-DC voltage converter 110 of the power transmitter 100 as shown in FIG. 1. The DC-to-DC voltage converter 110 includes a switch 412 (e.g., switch S1), a switch 414 (e.g., switch S2), a switch 416 (e.g., switch S3), a switch 418 (e.g., switch S4), capacitors 422 and 424, and a coil 430. The coil 430 and the coil 140 are two separate coils. As shown in FIG. 4, one terminal of the switch 412 (e.g., switch S1) and one terminal of the capacitor 422 are both connected to an input terminal 440, which receives the input voltage 112 (e.g., $V_{IN}$). Additionally, one terminal of the switch 418 (e.g., switch S4) and one terminal of the capacitor 424 are both connected to an output terminal 442, which outputs the output voltage 114 (e.g., $V_{OUT}$). Closing and opening of the switch 412 (e.g., switch S1), the switch 414 (e.g., switch S2), the switch 416 (e.g., switch S3), and the switch 418 (e.g., switch S4) are controlled according to FIG. 5. For example, the DC-to-DC voltage converter 110 as shown in FIG. 4 performs in-phase voltage conversion, and the output voltage 114 (e.g., $V_{OUT}$) can be larger than, equal to, or smaller than the input voltage 112 (e.g., $V_{IN}$). As an example, the DC-to-DC voltage converter 110 uses a current-mode dual-edge control mechanism.

FIG. 5 shows a simplified timing diagram for the conventional DC-to-DC voltage converter 110 of the power transmitter 100 as shown in FIG. 4. The waveform 510 represents a signal "RAMP1+ISNS" as a function of time, and the waveform 520 represents a signal "RAMP2+ISNS" as a function of time. For example, the signal "RAMP1+ISNS" is a ramp signal that is related to a current flowing through the coil 430, and the signal "RAMP2+ISNS" is also a ramp signal that is related to the current flowing through the coil 430. As an example, the waveform 510 for the signal "RAMP1+ISNS" and the waveform 520 for the signal "RAMP2+ISNS" intersect at a voltage level 530 that is used as a threshold voltage (e.g., MID). Additionally, the waveform 540 represents a compensation voltage as a function of time. In some examples, the compensation voltage (e.g., COMP) is generated by an error amplifier that is part of the conventional DC-to-DC voltage converter 110 as shown in FIG. 4. For example, when the compensation voltage (e.g., COMP) is smaller than the threshold voltage 530 (e.g., MID) as shown by the waveform 540, the output voltage 114 (e.g., $V_{OUT}$) is smaller than the input voltage 112 (e.g., $V_{IN}$). As an example, when the compensation voltage (e.g., COMP) is larger than the threshold voltage 530 (e.g., MID) as shown by the waveform 540, the output voltage 114 (e.g., $V_{OUT}$) is larger than the input voltage 112 (e.g., $V_{IN}$).

As shown in FIG. 5, the waveform 550 represents closing and opening of the switch 412 (e.g., switch S1) as a function of time, the waveform 560 represents closing and opening of the switch 414 (e.g., switch S2) as a function of time, the waveform 570 represents closing and opening of the switch 416 (e.g., switch S3) as a function of time, and the waveform 580 represents closing and opening of the switch 418 (e.g., switch S4) as a function of time. For example, each waveform of the waveforms 550, 560, 570 and 580 changes between a high logic level and a low logic level. As an example, at the high logic level, the switch is closed, and at the low logic level, the switch is open.

As shown in FIG. 4 and FIG. 5, the conventional DC-to-DC voltage converter 110 of the power transmitter 100 is a non-inverting buck-boost converter. In order to generate the output voltage 114 (e.g., $V_{OUT}$) that is close to the input voltage 112 (e.g., $V_{IN}$), the compensation voltage (e.g., COMP) needs to be close to the threshold voltage 530 (e.g., MID). Under this operation condition, if there is any disturbance to the input voltage 112 (e.g., $V_{IN}$) and/or the output voltage 114 (e.g., $V_{OUT}$), the non-inverting buck-boost converter 110 often alternates irregularly and quickly between the buck mode and the boost mode. For example, in the buck mode, the output voltage 114 (e.g., $V_{OUT}$) is smaller than the input voltage 112 (e.g., $V_{IN}$). As an example, in the boost mode, the output voltage 114 (e.g., $V_{OUT}$) is larger than the input voltage 112 (e.g., $V_{IN}$). Such changes between the buck mode and the boost mode usually results in a high frequency for voltages at system nodes 480 (e.g., SW1) and 482 (e.g., SW2), often leading to significant electromagnetic interference (EMI) issues.

In certain examples, the conventional DC-to-DC voltage converter 110 of the power transmitter 100 as shown in FIG. 1 is a non-inverting buck-boost converter, which reduces by half the frequency for the voltages at the system nodes 480 (e.g., SW1) and 482 (e.g., SW2) when the non-inverting buck-boost converter changes between the buck mode and a mode under which the output voltage 114 (e.g., $V_{OUT}$) is approximately equal (e.g., being equal) to the input voltage 112 (e.g., $V_{IN}$) and also when the non-inverting buck-boost converter changes between the boost mode and the mode under which the output voltage 114 (e.g., $V_{OUT}$) is approximately equal (e.g., being equal) to the input voltage 112 (e.g., $V_{IN}$). Such reduction of frequency usually lowers the speed of line transient response of the non-inverting buck-boost converter 110, often causing undesirable changes between different modes. In order to prevent these undesirable changes of modes, the threshold-voltage hysteresis for mode changes usually is increased, but such increase often leads to undesirable increase of the ripple of the output voltage 114 (e.g., $V_{OUT}$).

In some examples, the conventional DC-to-DC voltage converter 110 of the power transmitter 100 as shown in FIG. 1 is a non-inverting buck-boost converter that employs a voltage-mode control mechanism. With this voltage-mode control mechanism, the non-inverting buck-boost converter often compares a voltage generated by an error amplifier that is part of the conventional DC-to-DC voltage converter 110 with a sawtooth-waveform voltage that does not represent a current flowing through a coil that is also part of the conventional DC-to-DC voltage converter 110. Relying on such comparison, as an example, the load transient response and the line transient response of the conventional DC-to-DC voltage converter 110 are slow, thus causing undesirable performance issues.

Usually, conventional DC-to-DC voltage converters cannot achieve the desirable matching between a wide range of the input voltage and a wide range of the output voltage. Hence it is highly desirable to improve the techniques related to DC-to-DC voltage converters of power transmitters.

3. BRIEF SUMMARY OF THE INVENTION

Certain embodiments of the present invention are directed to circuits. More particularly, some embodiments of the invention provide systems and methods for controlling operation modes of DC-to-DC voltage converters. Merely by way of example, some embodiments of the invention have been applied to buck-boost converters. But it would be recognized that the invention has a much broader range of applicability.

According to some embodiments, a voltage converter for converting an input voltage to an output voltage includes: a coil; multiple switches including one or more switches connected to the coil; a modulation signal generator configured to: receive the output voltage and one or more detection signals indicating a magnitude of a coil current flowing through the coil; and generate a first signal and a second signal based at least in part upon the output voltage and the one or more detection signals; and an operation mode controller configured to: receive the input voltage, the output voltage, the first signal, and the second signal; and generate one or more mode signals based at least in part upon the input voltage, the output voltage, the first signal, and the second signal; wherein the one or more mode signals indicate that the voltage converter operates in an operation mode selected from multiple operation modes.

According to certain embodiments, a method for converting an input voltage to an output voltage, the method comprising: receiving the output voltage and one or more detection signals indicating a magnitude of a coil current flowing through a coil connected to one or more switches of multiple switches; generating a first signal and a second signal based at least in part upon the output voltage and the one or more detection signals; receiving the input voltage, the output voltage, the first signal, and the second signal; and generating one or more mode signals based at least in part upon the input voltage, the output voltage, the first signal, and the second signal; wherein the one or more mode signals indicate that the voltage converter operates in an operation mode selected from multiple operation modes.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 9:
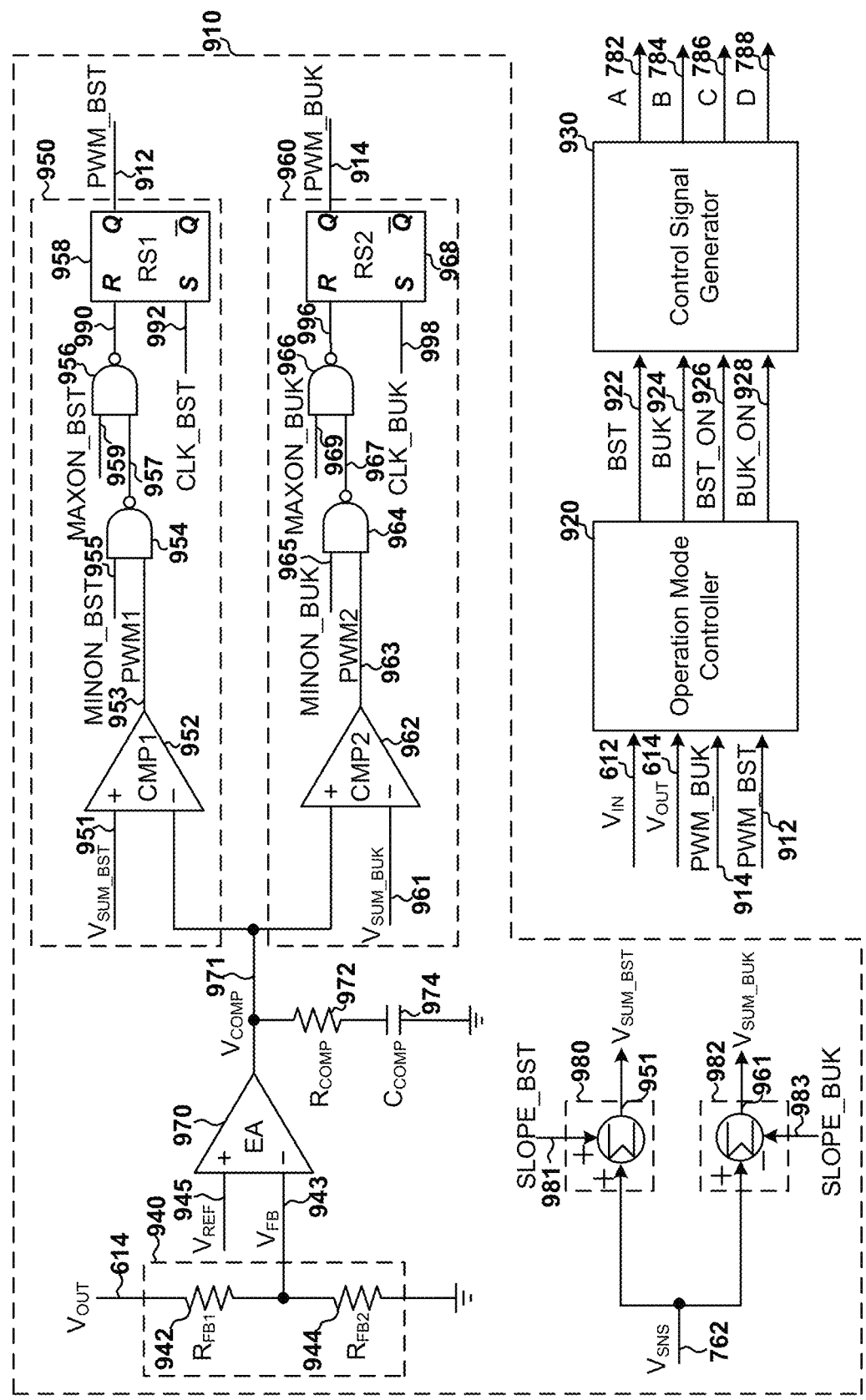
FIG. 9 is a simplified diagram showing certain components of the voltage controller of the DC-to-DC voltage converter as shown in FIG. 7 according to certain embodiments of the present invention.
Figure 10B:
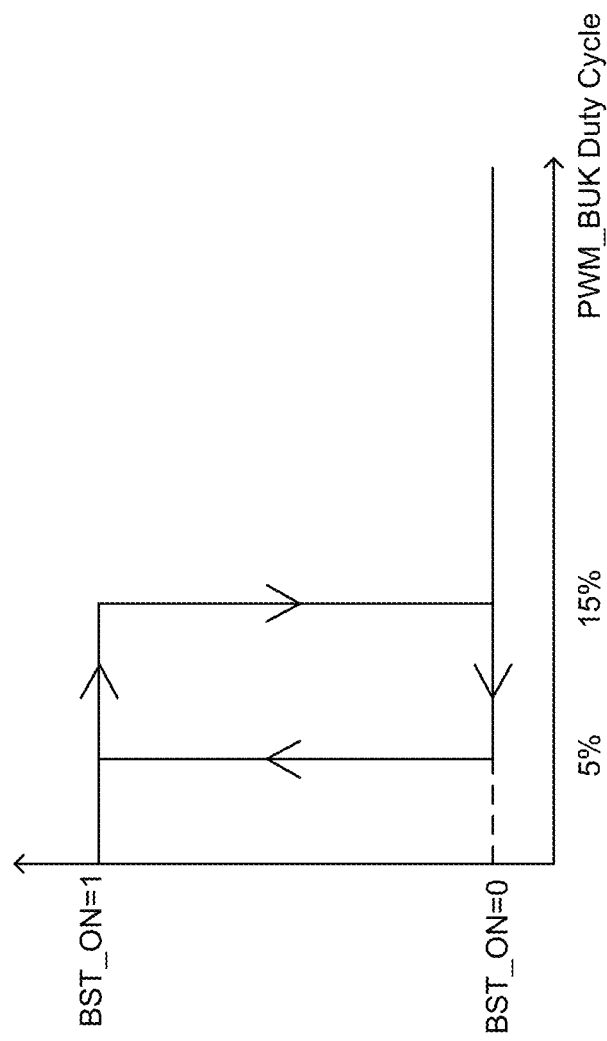

FIG. 10A, FIG. 10B, and FIG. 10C are simplified diagrams showing certain operations of the operation mode controller of the voltage controller as part of the DC-to-DC voltage converter as shown in FIG. 9 according to certain embodiments of the present invention.

Figure 11:
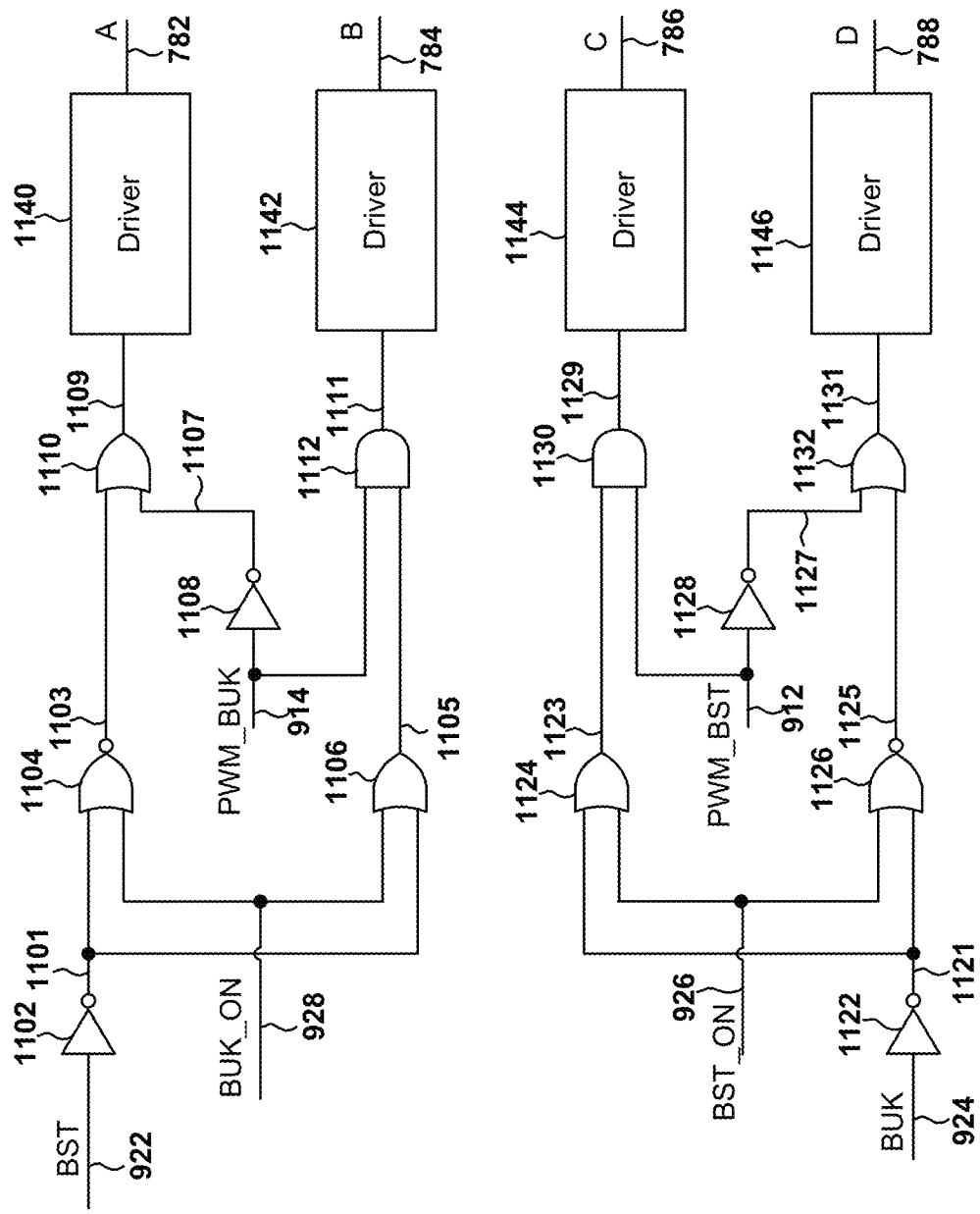

FIG. 11 is a simplified diagram showing certain components of the control signal generator of the voltage controller as part of the DC-to-DC voltage converter as shown in FIG. 9 according to some embodiments of the present invention.

Figure 12:
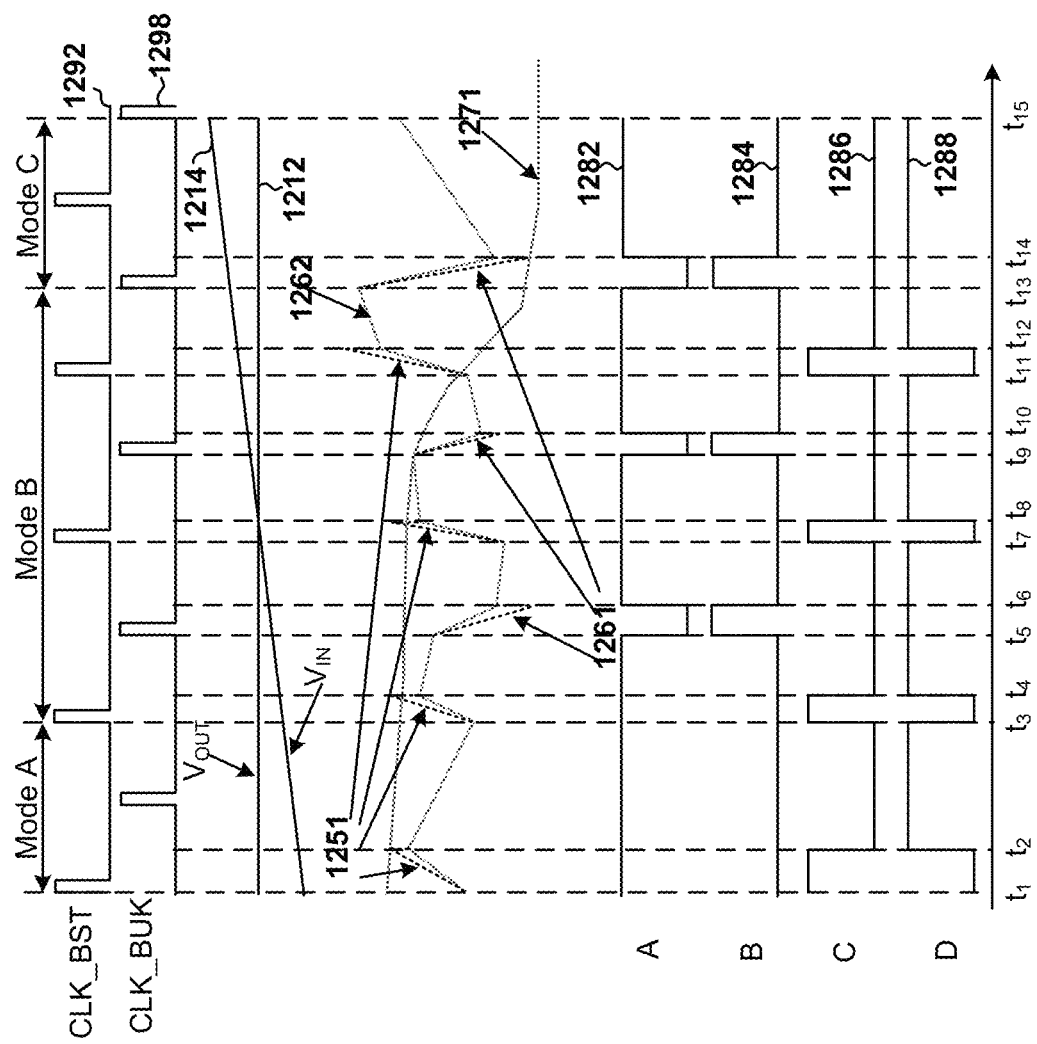

FIG. 12 is a simplified timing diagram showing the DC-to-DC voltage converter as shown in FIG. 7, FIG. 8, FIG. 9 and FIG. 11 according to some embodiments of the present invention.

Figure 13:
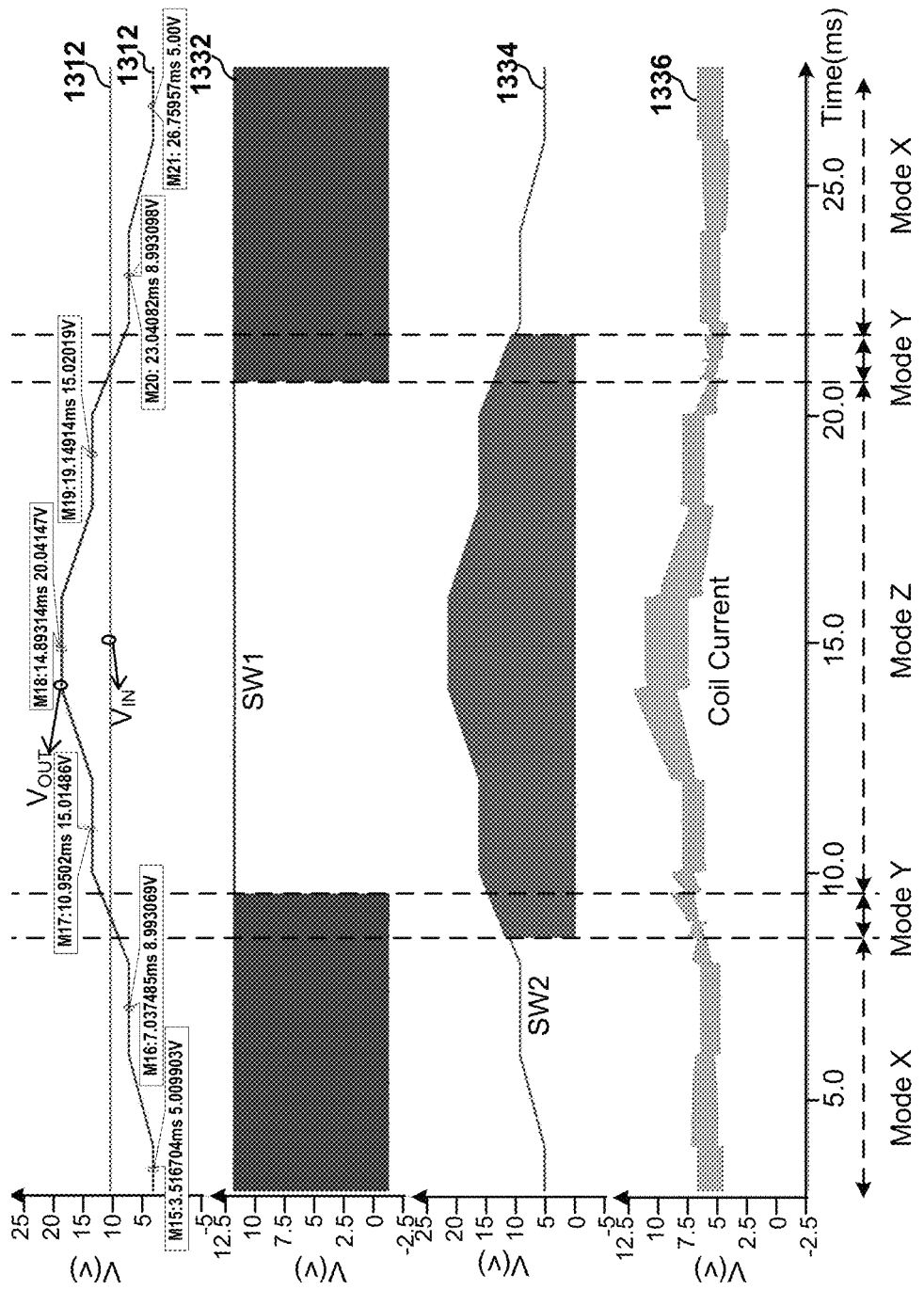

FIG. 13 is a simplified timing diagram showing the DC-to-DC voltage converter as shown in FIG. 7, FIG. 8, FIG. 9 and FIG. 11 according to certain embodiments of the present invention.

Figure 14:
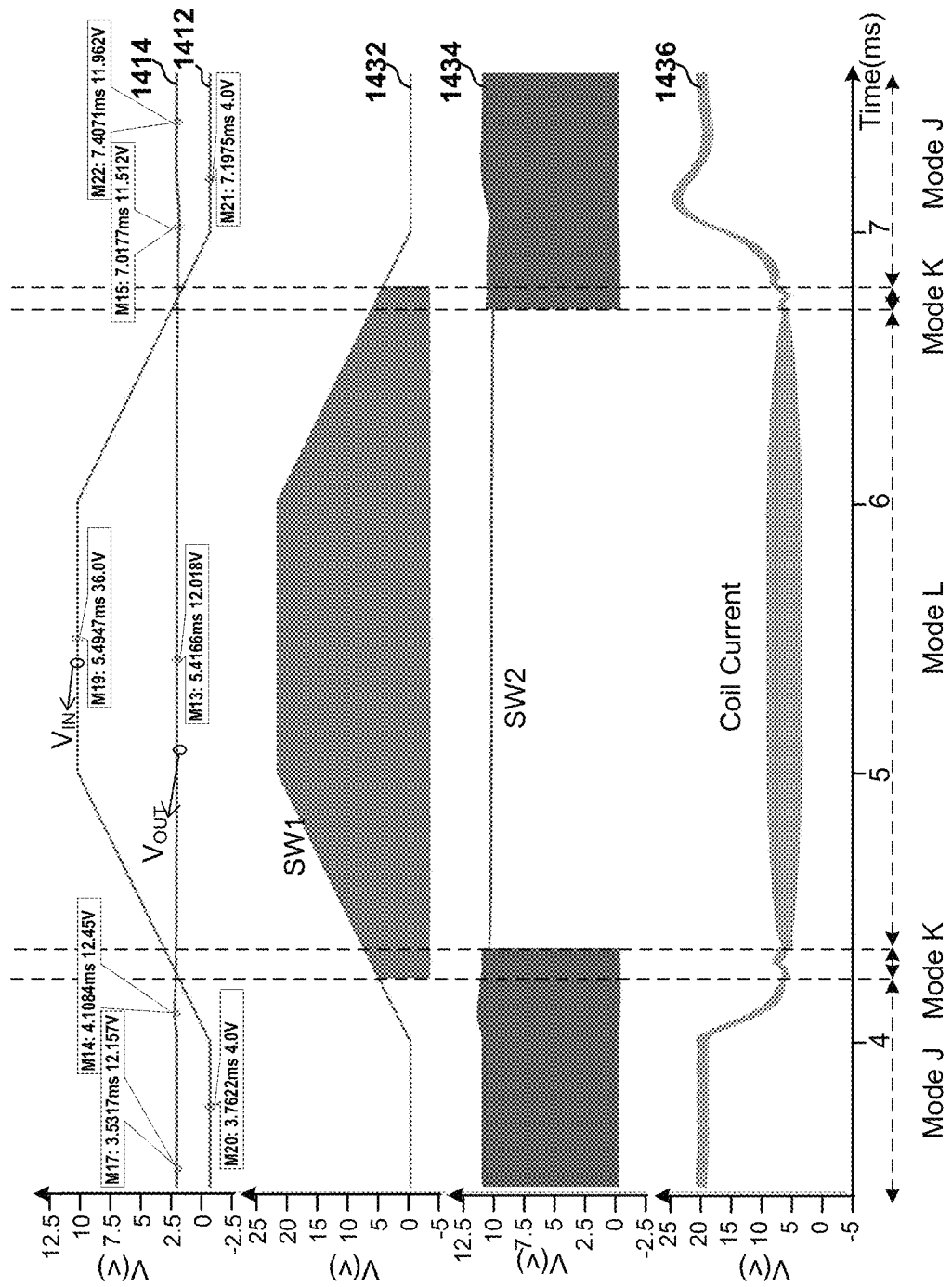

FIG. 14 is a simplified timing diagram showing the DC-to-DC voltage converter as shown in FIG. 7, FIG. 8, FIG. 9 and FIG. 11 according to some embodiments of the present invention.

Figure 7:
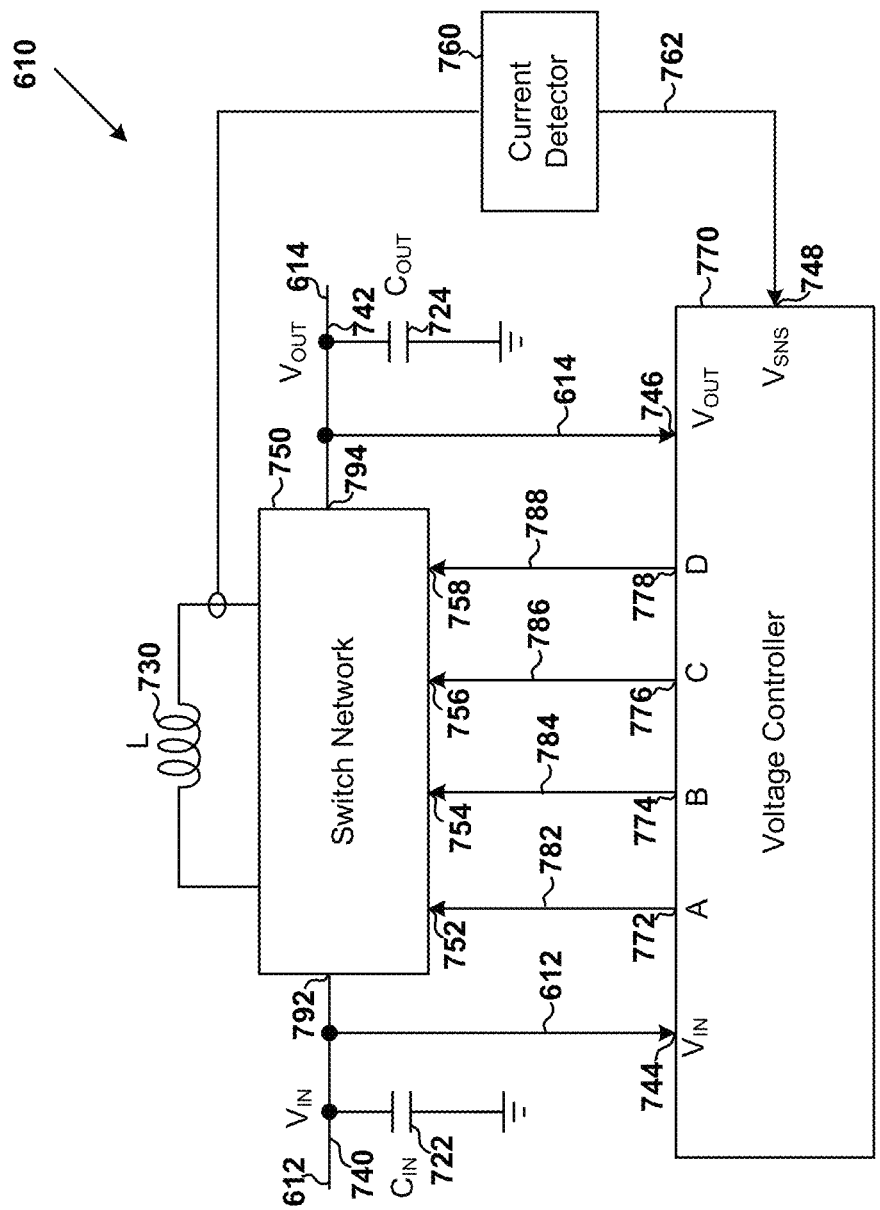
FIG. 7 is a simplified diagram showing the DC-to-DC voltage converter according to certain embodiments of the present invention.
Figure 15:
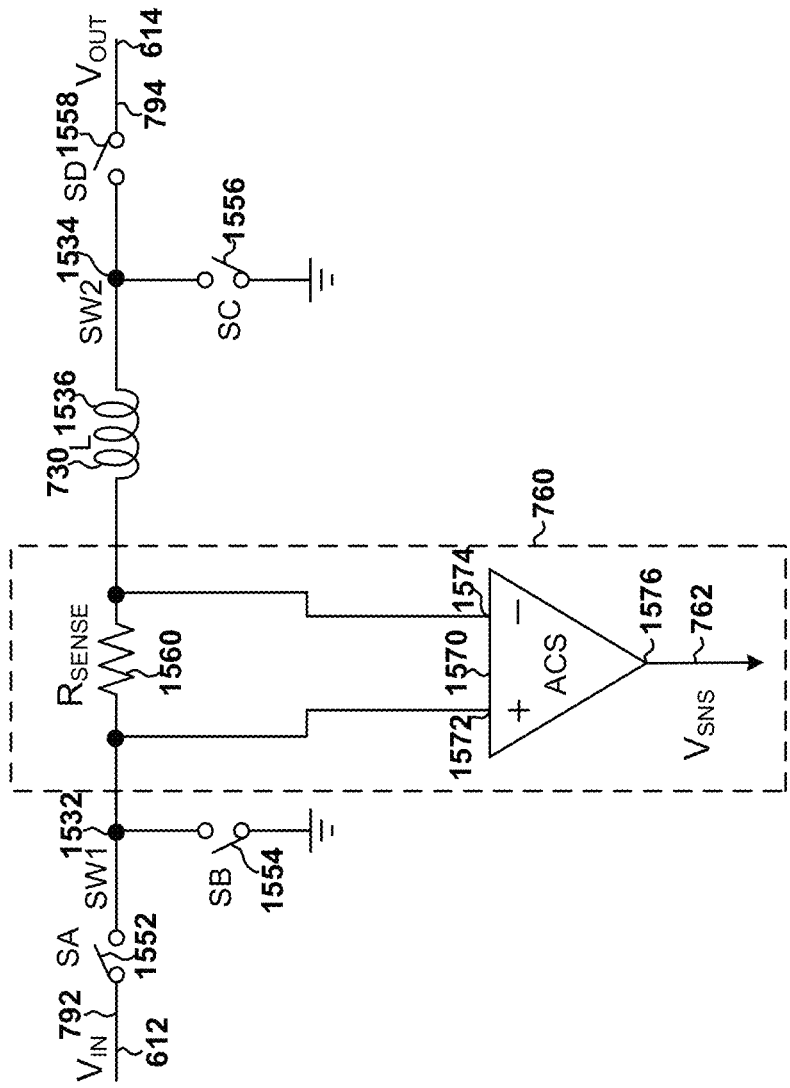

FIG. 15 is a simplified diagram showing certain components of the DC-to-DC voltage converter as shown in FIG. 7 according to some embodiments of the present invention.

Figure 16:
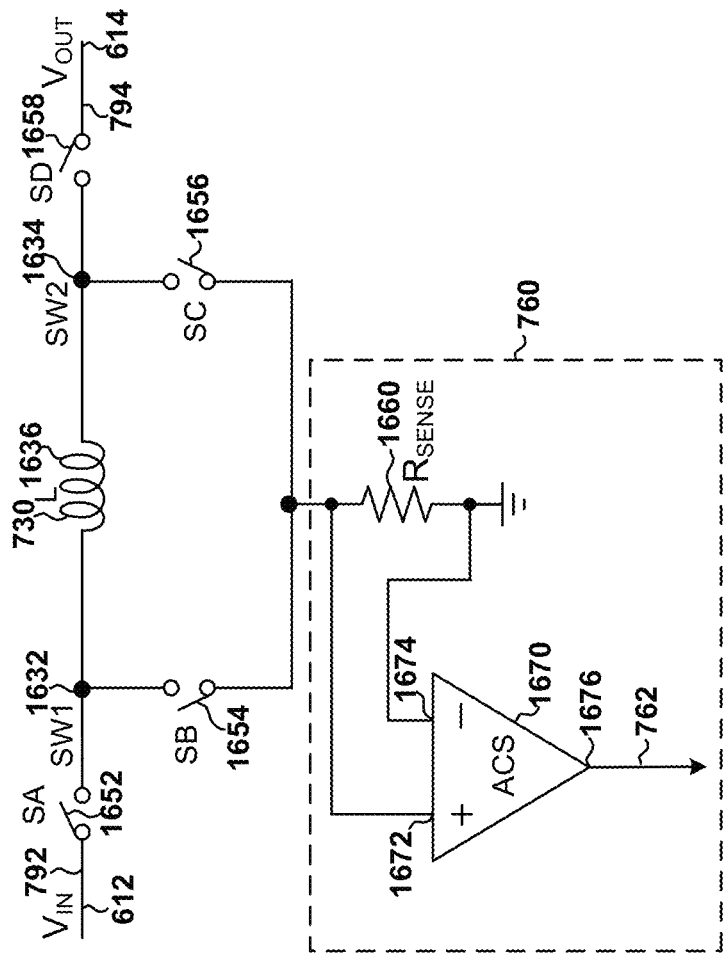

FIG. 16 is a simplified diagram showing certain components of the DC-to-DC voltage converter as shown in FIG. 7 according to certain embodiments of the present invention.

Figure 17:
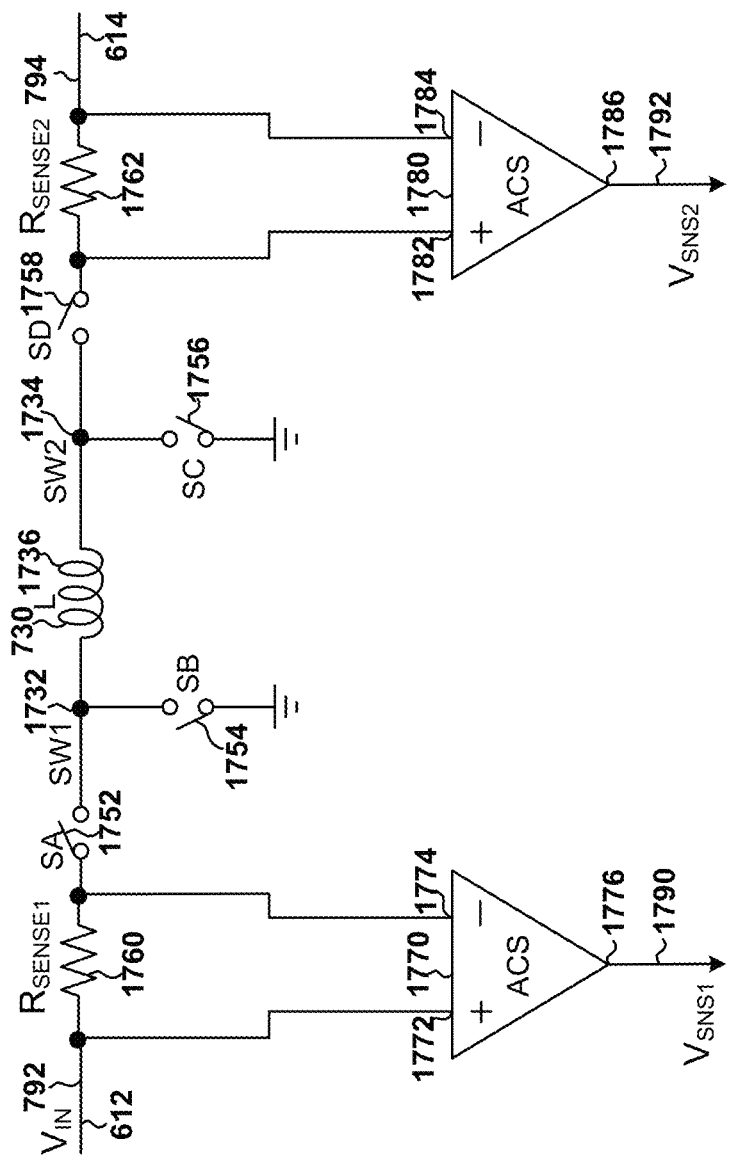

FIG. 17 is a simplified diagram showing certain components of the DC-to-DC voltage converter as shown in FIG. 7 according to some embodiments of the present invention.

5. DETAILED DESCRIPTION OF THE INVENTION

Certain embodiments of the present invention are directed to circuits. More particularly, some embodiments of the invention provide systems and methods for controlling operation modes of DC-to-DC voltage converters. Merely by way of example, some embodiments of the invention have been applied to buck-boost converters. But it would be recognized that the invention has a much broader range of applicability.

Figure 1:
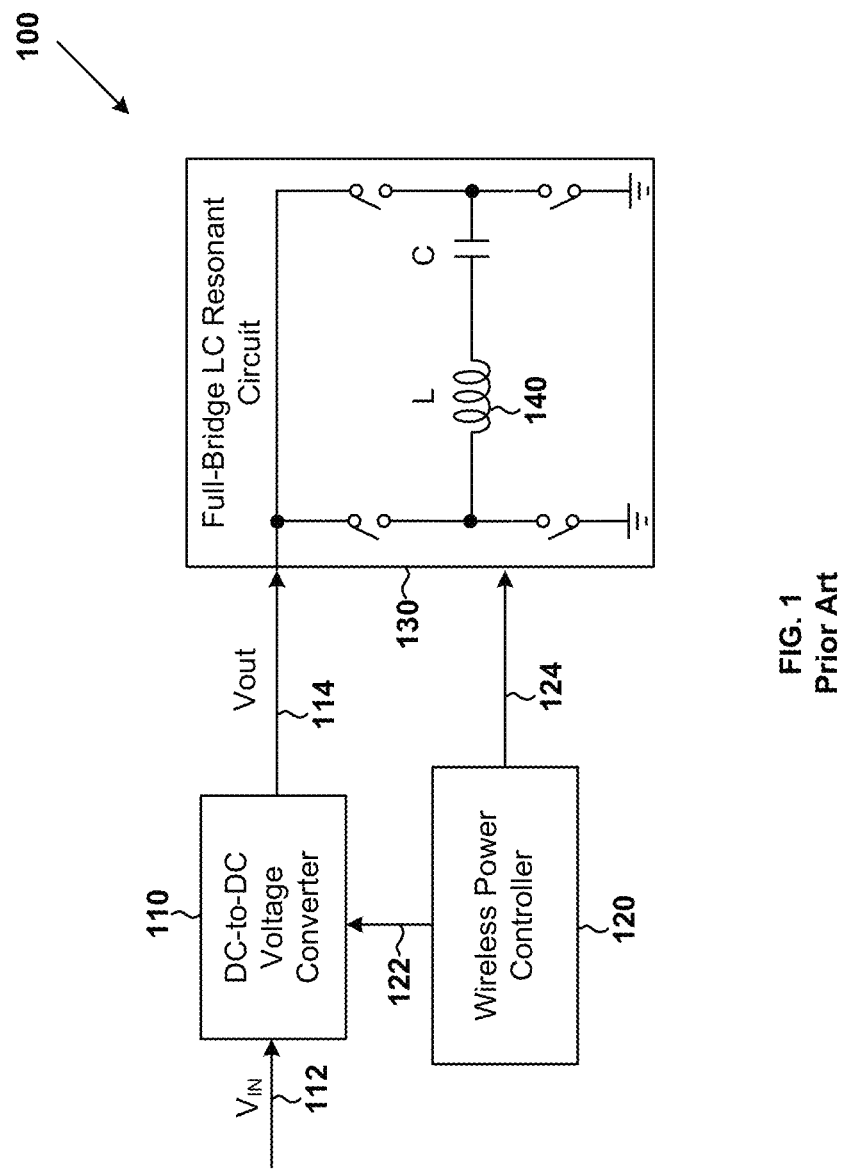
FIG. 1 is a simplified diagram showing a conventional power transmitter of a wireless charging system.
Figure 2:
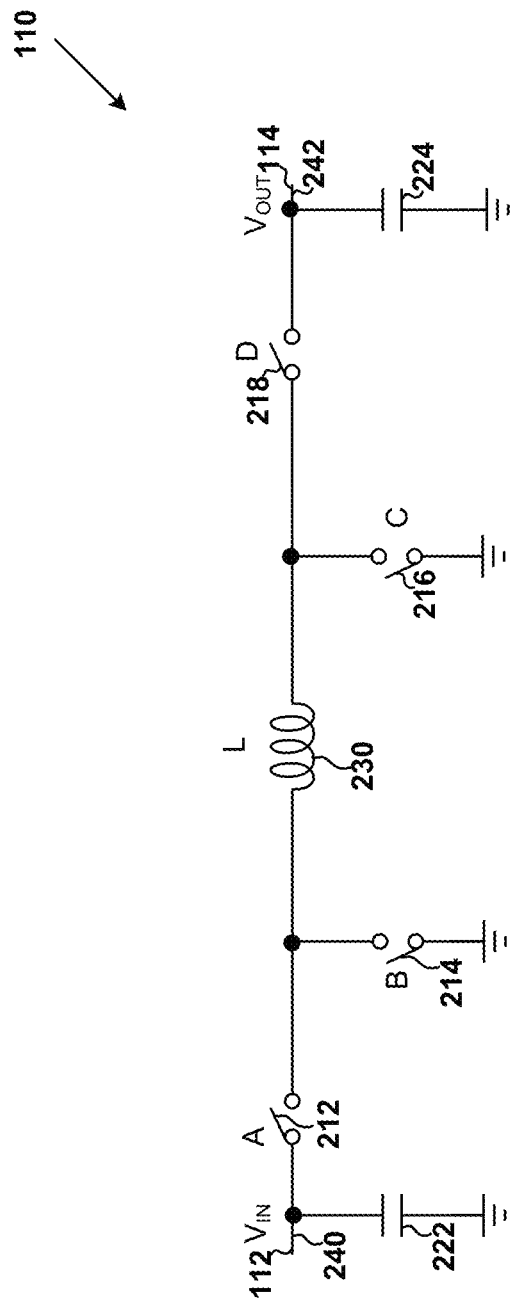
FIG. 2 is a simplified diagram showing an example of the conventional DC-to-DC voltage converter of the power transmitter as shown in FIG. 1.
Figure 3:
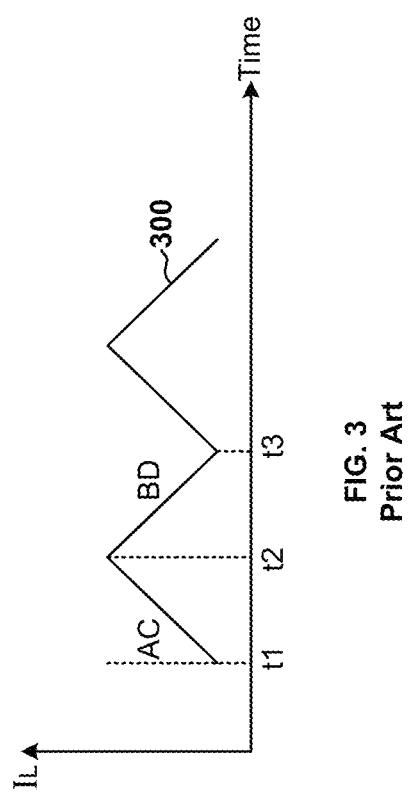
FIG. 3 shows a simplified timing diagram for the conventional DC-to-DC voltage converter of the power transmitter as shown in FIG. 2.
Figure 4:
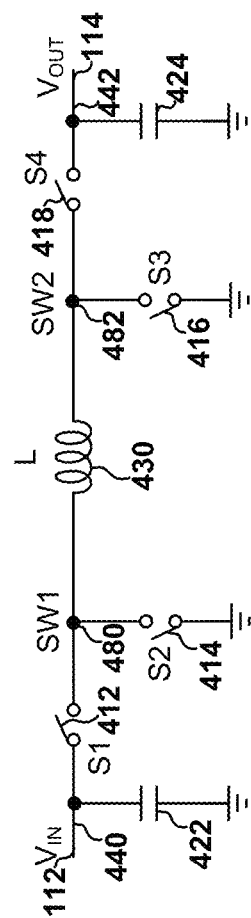
FIG. 4 is a simplified diagram showing another example of the conventional DC-to-DC voltage converter of the power transmitter as shown in FIG. 1.
Figure 5:
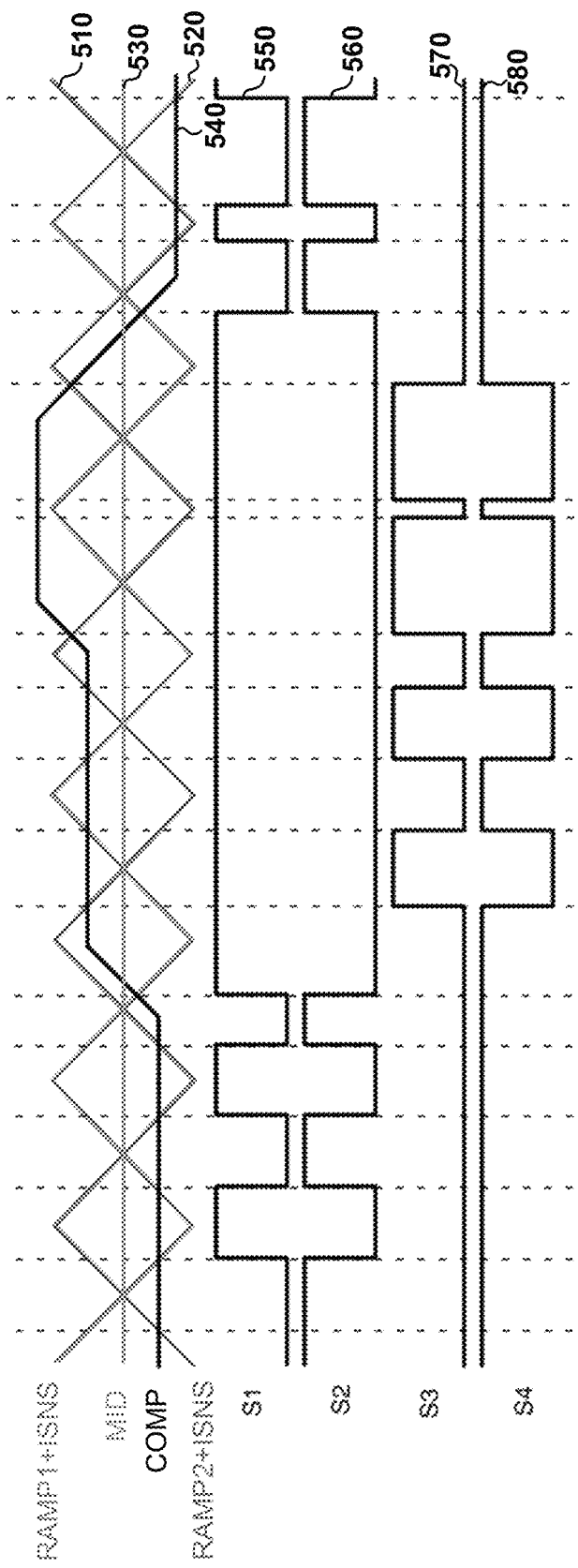
FIG. 5 shows a simplified timing diagram for the conventional DC-to-DC voltage converter of the power transmitter as shown in FIG. 4.
Figure 6:
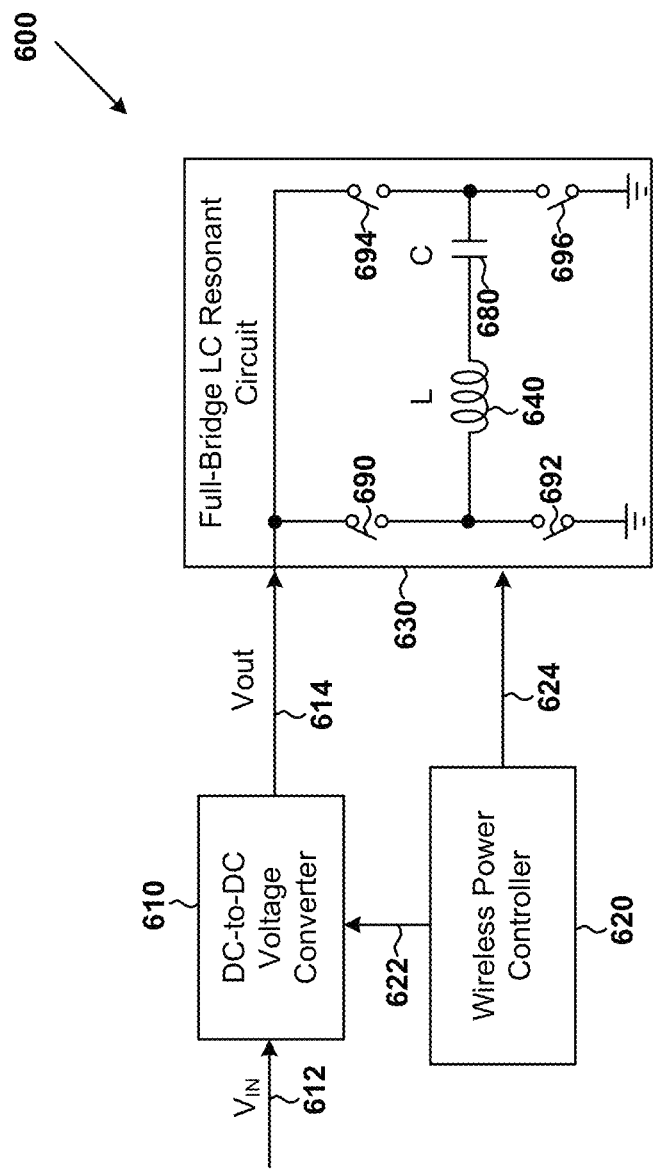
FIG. 6 is a simplified diagram showing a power transmitter of a wireless charging system according to certain embodiments of the present invention.

FIG. 6 is a simplified diagram showing a power transmitter of a wireless charging system according to certain embodiments of the present invention. This diagram is merely an example, which should not unduly limit the scope of the claims. One of ordinary skill in the art would recognize many variations, alternatives, and modifications. The power transmitter 600 includes a DC-to-DC voltage converter 610, a wireless power controller 620, and a full-bridge LC resonant circuit 630, and the DC-to-DC voltage converter 610 includes components as shown in FIG. 9. As an example, the full-bridge LC resonant circuit 630 includes a coil 640, a capacitor 680, and switches 690, 692, 694 and 696. Although the above has been shown using a selected group of components for the power transmitter 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some examples, the wireless power controller 620 generates control signals 622 and 624. For example, the control signal 622 is received by the DC-to-DC voltage converter 610. As an example, the control signal 624 is received by the full-bridge LC resonant circuit 630. In certain examples, the DC-to-DC voltage converter 610 receives an input voltage 612 (e.g., $V_{IN}$). For example, in response to the control signal 622, the DC-to-DC voltage converter 610 uses the input voltage 612 (e.g., $V_{IN}$) to generate an output voltage 614 (e.g., $V_{OUT}$). As an example, the input voltage 612 (e.g., $V_{IN}$) and the output voltage 614 (e.g., $V_{OUT}$) both are DC voltages, whose magnitudes satisfy a predetermined matching relationship. In certain examples, the output voltage 614 (e.g., $V_{OUT}$) is received by the full-bridge LC resonant circuit 630. For example, the full-bridge LC resonant circuit 630 includes the coil 640 that is coupled to another coil of a power receiver as part of the wireless charging system. As an example, the input voltage 612 (e.g., $V_{IN}$) is provided through a USB port from a power adapter, a 12-volt power source on an automobile, and/or a portable power bank. In some examples, the output voltage 614 (e.g., $V_{OUT}$) is higher than, equal to, or lower than the input voltage 612 (e.g., $V_{IN}$).

As shown in FIG. 6, the DC-to-DC voltage converter 610 operates in a boost mode and/or in a buck mode according to some embodiments. In certain examples, the DC-to-DC voltage converter 610 operates in the boost mode. For example, in the boost mode, the DC-to-DC voltage converter 610 functions as a step-up converter. As an example, in the boost mode, the output voltage 614 (e.g., $V_{OUT}$) is larger than the input voltage 612 (e.g., $V_{IN}$). In some examples, the DC-to-DC voltage converter 610 operates in the buck mode. For example, in the buck mode, the DC-to-DC voltage converter 610 functions as a step-down converter. As an example, in the buck mode, the output voltage 614 (e.g., $V_{OUT}$) is smaller than the input voltage 612 (e.g., $V_{IN}$).

FIG. 7 is a simplified diagram showing the DC-to-DC voltage converter 610 according to certain embodiments of the present invention. This diagram is merely an example, which should not unduly limit the scope of the claims. One of ordinary skill in the art would recognize many variations, alternatives, and modifications. The DC-to-DC voltage converter 610 includes a capacitor 722 (e.g., $C_{IN}$), a capacitor 724 (e.g., $C_{OUT}$), a coil 730, a switch network 750, a current detector 760, and a voltage controller 770, and the voltage controller 770 includes components as shown in FIG. 9. Additionally, the DC-to-DC voltage converter 610 also includes an input terminal 740 and an output terminal 742. Although the above has been shown using a selected group of components for the DC-to-DC voltage converter 610, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 7, the voltage controller 770 includes input terminals 744 and 746 and output terminals 772, 774, 776 and 778, and the switch network 750 includes input terminals 752, 754, 756 and 758 according to some embodiments. For example, the switch network 750 includes multiple switches. As an example, the multiple switches of the switch network 750 include one or more switches that are connected to the coil 730. For example, the switch network 750 also includes an input terminal 792 and the output terminal 794, where the input terminal 792 is connected to the input terminal 740 and the output terminal 794 is connected to the output terminal 742. In certain examples, the coil 730 and the coil 640 are two separate coils. In some examples, the input terminal 740 receives the input voltage 612 (e.g., $V_{IN}$), and the output terminal 742 outputs the output voltage 614 (e.g., $V_{OUT}$). For example, one terminal of the capacitor 722 (e.g., $C_{IN}$) is connected to the input terminal 740, and another terminal of the capacitor 722 (e.g., $C_{IN}$) is biased to a ground voltage. As an example, one terminal of the capacitor 724 (e.g., $C_{OUT}$) is connected to the output terminal 742, and another terminal of the capacitor 724 (e.g., $C_{OUT}$) is biased to the ground voltage.

In certain embodiments, the current detector 760 is used to detect a coil current that flows through the coil 730 and generates a detection signal 762. For example, the current detector 760 includes a current sensing resistor, where the voltage drop across the current sensing resistor depends on the current that flow through the coil 730. As an example, the voltage drop across the current sensing resistor is used to generate the detection signal 762 (e.g., $V_{SNS}$).

In some embodiments, the voltage controller 770 receives the detection signal 762 (e.g., $V_{SNS}$) at the input terminal 748, receives the input voltage 612 (e.g., $V_{IN}$) at the input terminal 744, and receives the output voltage 614 (e.g., $V_{OUT}$) at the input terminal 746. As an example, based at least in part on the input voltage 612 (e.g., $V_{IN}$), the output voltage 614 (e.g., $V_{OUT}$), and the detection signal 762 (e.g., $V_{SNS}$), the voltage controller 770 generates control signals 782, 784, 786 and 788.

According to certain embodiments, the voltage controller 770 outputs the control signals 782, 784, 786 and 788 at the output terminals 772, 774, 776 and 778 respectively, and the switch network 750 receives the control signals 782, 784, 786 and 788 at the input terminals 752, 754, 756 and 758 respectively. For example, the switch network 750 uses the control signals 782, 784, 786 and 788 to close or open the multiple switches (e.g., four switches) of the switch network 750 in order to control the increase or the decrease of the output voltage 614 (e.g., $V_{OUT}$). As an example, the output voltage 614 (e.g., $V_{OUT}$) is controlled to be equal to, smaller than, or larger than the input voltage 612 (e.g., $V_{IN}$).

As shown in FIG. 7, the DC-to-DC voltage converter 610 operates in a boost mode and/or in a buck mode according to some embodiments. In certain examples, the DC-to-DC voltage converter 610 operates in the boost mode. For example, in the boost mode, the DC-to-DC voltage converter 610 functions as a step-up converter. As an example, in the boost mode, the output voltage 614 (e.g., $V_{OUT}$) is larger than the input voltage 612 (e.g., $V_{IN}$). In some examples, the DC-to-DC voltage converter 610 operates in the buck mode. For example, in the buck mode, the DC-to-DC voltage converter 610 functions as a step-down converter. As an example, in the buck mode, the output voltage 614 (e.g., $V_{OUT}$) is smaller than the input voltage 612 (e.g., $V_{IN}$).

As discussed above and further emphasized here, FIG. 7 is merely an example, which should not unduly limit the scope of the claims. One of ordinary skill in the art would recognize many variations, alternatives, and modifications. In some examples, the coil 730 is part of the switch network 750, which also includes the multiple switches. In certain examples, the DC-to-DC voltage converter 610 is not a part of the power transmitter 600 as shown in FIG. 6. For example, the DC-to-DC voltage converter 610 is in compliance with USB Power Delivery (USB PD). As an example, the DC-to-DC voltage converter 610 is used for power supply in an automobile.

Figure 8:
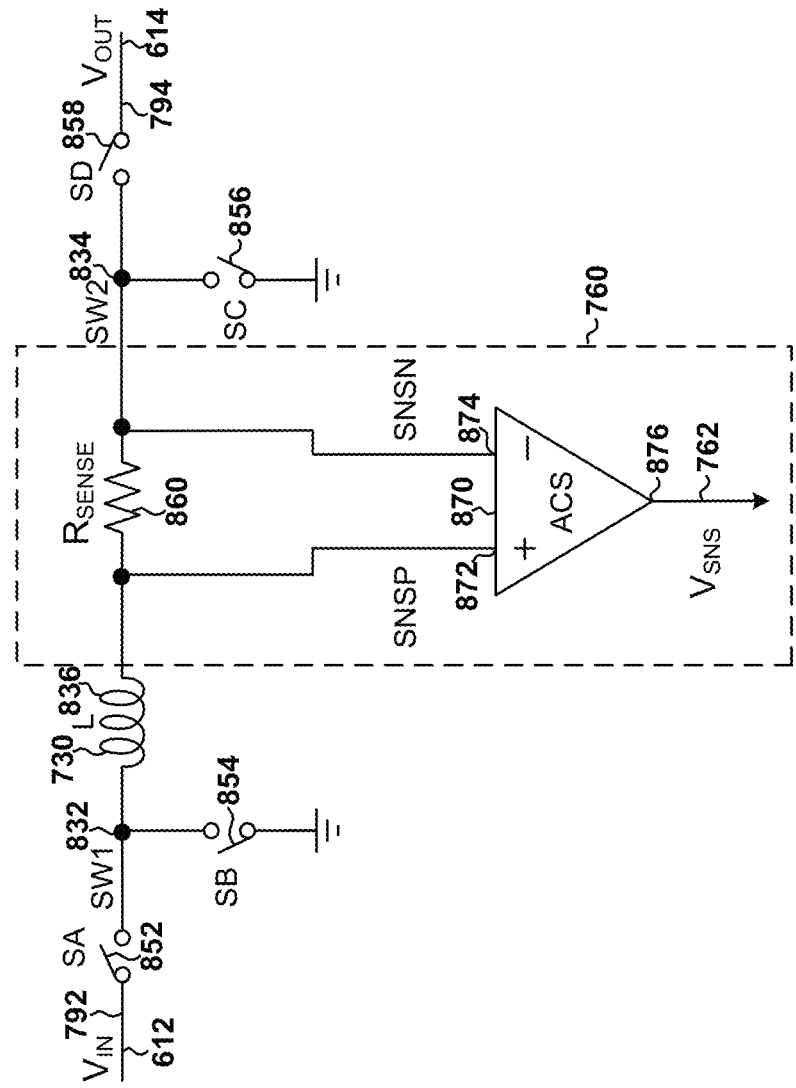
FIG. 8 is a simplified diagram showing certain components of the DC-to-DC voltage converter as shown in FIG. 7 according to some embodiments of the present invention.

FIG. 8 is a simplified diagram showing certain components of the DC-to-DC voltage converter 610 as shown in FIG. 7 according to some embodiments of the present invention. This diagram is merely an example, which should not unduly limit the scope of the claims. One of ordinary skill in the art would recognize many variations, alternatives, and modifications. As an example, the switch network 750 includes the input terminal 792 and the output terminal 794, and also includes a switch 852, a switch 854, a switch 856, and a switch 858. For example, the current detector 760 includes a current sensing resistor 860 and a current sampling amplifier 870. Although the above has been shown using a selected group of components for the DC-to-DC voltage converter 610, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the switch 852 (e.g., SA), the coil 730, the current sensing resistor 860, and the switch 858 (e.g., SD) are connected in series. In some examples, one terminal of the switch 852 (e.g., SA) is connected to the input terminal 792 that receives the input voltage 612 (e.g., $V_{IN}$), and another terminal of the switch 852 (e.g., SA) is connected to one terminal of the coil 730 and one terminal of the switch 854 (e.g., SB) through a node 832 (e.g., SW1). For example, another terminal of the switch 854 (e.g., SB) is biased to the ground voltage. In certain examples, one terminal of the switch 858 (e.g., SD) is connected to the output terminal 794 that outputs the output voltage 614 (e.g., $V_{OUT}$), and another terminal of the switch 858 (e.g., SD) is connected to the current sensing resistor 860 and one terminal of the switch 856 (e.g., SC) through a node 834 (e.g., SW2). As an example, another terminal of the switch 856 (e.g., SC) is biased to the ground voltage. For example, another terminal of the current sensing resistor 860 is connected to another terminal of the coil 730. In some examples, a coil current 836 (e.g., $I_L$) flows through the coil 730 as shown in FIG. 13. For example, the current sensing resistor 860 allows the coil current 836 (e.g., $I_L$) to flow through the current sensing resistor 860.

According to some embodiments, the control signal 782 is used to close or open the switch 852 (e.g., SA), the control signal 784 is used to close or open the switch 854 (e.g., SB), the control signal 786 is used to close or open the switch 856 (e.g., SC), and the control signal 788 is used to close or open the switch 858 (e.g., SD). For example, under certain condition, both the switch 852 (e.g., SA) and the switch 858 (e.g., SD) are closed, so that a current flows from the input terminal 792 to the output terminal 794 through the switch 852 (e.g., SA), the coil 730, the current sensing resistor 860, and the switch 858 (e.g., SD). As an example, allowing both the switch 852 (e.g., SA) and the switch 858 (e.g., SD) to be closed at the same time reduces the average magnitude of the coil current 836 (e.g., $I_L$) that flows through the coil 730 and also lowers the conduction loss.

In some embodiments, the current sampling amplifier 870 (e.g., ACS) includes an input terminal 872, an input terminal 874, and an output terminal 876. For example, the input terminal 872 (e.g., SNSP) is connected to one terminal of the current sensing resistor 860, and the input terminal 874 (e.g., SNSN) is connected to another terminal of the current sensing resistor 860. As an example, the output terminal 876 outputs the detection signal 762.

In certain embodiments, the current sensing resistor 860 converts the coil current 836, which flows through the coil 730, to a voltage difference across the current sensing resistor 860. For example, the voltage difference across the current sensing resistor 860 is equal to a voltage difference between the input terminal 872 (e.g., SNSP) and the input terminal 874 (e.g., SNSN). As an example, the voltage difference between the input terminal 872 (e.g., SNSP) and the input terminal 874 (e.g., SNSN) is used by the current sampling amplifier 870 (e.g., ACS) to generate the detection signal 762 at the output terminal 876.

According to some embodiments, the detection signal 762 represents an amplified magnitude of the coil current 836 during multiple switching cycles. For example, the detection signal 762 (e.g., $V_{SNS}$) represents the amplified magnitude of the coil current 836 during one switching cycle, and then the detection signal 762 (e.g., $V_{SNS}$) represents the amplified magnitude of the coil current 836 during another switching cycle. As an example, each switching cycle includes one half switching cycle during which both the switch 852 (e.g., SA) and the switch 856 (e.g., SC) are closed and both the switch 854 (e.g., SB) and the switch 858 (e.g., SD) are open, and also includes another half switching cycle during which both the switch 852 (e.g., SA) and the switch 856 (e.g., SC) are open and both the switch 854 (e.g., SB) and the switch 858 (e.g., SD) are closed.

FIG. 9 is a simplified diagram showing certain components of the voltage controller 770 of the DC-to-DC voltage converter 610 as shown in FIG. 7 according to certain embodiments of the present invention. This diagram is merely an example, which should not unduly limit the scope of the claims. One of ordinary skill in the art would recognize many variations, alternatives, and modifications. As an example, the voltage controller 770 includes a modulation signal generator 910, an operation mode controller 920, and a control signal generator 930. Although the above has been shown using a selected group of components for the voltage controller 770, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the modulation signal generator 910 receives the output voltage 614 (e.g., $V_{OUT}$) and the detection signal 762 (e.g., $V_{SNS}$) and generates a pulse-width-modulation signal 912 for the boost mode (e.g., PWM_BST) and a pulse-width-modulation signal 914 for the buck mode (e.g., PWM_BUK). For example, the pulse-width-modulation signal 912 for the boost mode (e.g., PWM_BST) and the pulse-width-modulation signal 914 for the buck mode (e.g., PWM_BUK) are received by the operation mode controller 920, which also receives the input voltage 612 (e.g., $V_{IN}$) and the output voltage 614 (e.g., $V_{OUT}$) and generates a logic signal 922 (e.g., BST), a logic signal 924 (e.g., BUK), a logic signal 926 (e.g., BST_ON), and a logic signal 928 (e.g., BUK_ON). As an example, the logic signal 922 (e.g., BST), the logic signal 924 (e.g., BUK), the logic signal 926 (e.g., BST_ON), and the logic signal 928 (e.g., BUK_ON) are received by the control signal generator 930, which generates the control signals 782, 784, 786 and 788.

In certain embodiments, the modulation signal generator 910 includes a voltage divider 940, an error amplifier 970, a resistor 972, a capacitor 974, a pulse-width-modulation signal generator 950, a pulse-width-modulation signal generator 960, a voltage adder 980, and a voltage subtractor 982. In some examples, the voltage divider 940 includes a resistor 942 (e.g., $R_{FB1}$) and a resistor 944 (e.g., $R_{FB2}$). For example, one terminal of the resistor 942 (e.g., $R_{FB1}$) receives the output voltage 614 (e.g., $V_{OUT}$), and another terminal of the resistor 942 (e.g., $R_{FB1}$) is connected to one terminal of the resistor 944 (e.g., $R_{FB2}$) and used to generate a voltage 943 (e.g., $V_{FB}$). As an example, another terminal of the resistor 944 (e.g., $R_{FB2}$) is biased to the ground voltage. In certain examples, the error amplifier 970 includes an inverting input terminal (e.g., the "−" input terminal), a non-inverting input terminal (e.g., the "+" input terminal), and an output terminal. For example, the inverting input terminal (e.g., the "−" input terminal) is used to receive the voltage 943 (e.g., $V_{FB}$), and the non-inverting input terminal (e.g., the "+" input terminal) is used to receive a reference voltage 945 (e.g., $V_{REF}$). As an example, the output terminal of the error amplifier 970 is connected to a terminal of the resistor 972 (e.g., $R_{COMP}$). In some examples, the resistor 972 (e.g., $R_{COMP}$) also includes another terminal that is connected to a terminal of the capacitor 974 (e.g., $C_{COMP}$). For example, the capacitor 974 (e.g., $C_{COMP}$) also includes another terminal that is biased to the ground voltage.

In some embodiments, the error amplifier 970 operates together with the resistor 972 (e.g., $R_{COMP}$) and the capacitor 974 (e.g., $C_{COMP}$) and generates a compensation voltage 971 (e.g., $V_{COMP}$). For example, the compensation voltage 971 (e.g., $V_{COMP}$) is received by the pulse-width-modulation signal generator 950, which also receives a voltage 951 (e.g., $V_{SUM\_BST}$) from the voltage adder 980 and generates the pulse-width-modulation signal 912 for the boost mode (e.g., PWM_BST). As an example, the compensation voltage 971 (e.g., $V_{COMP}$) is also received by the pulse-width-modulation signal generator 960, which also receives a voltage 961 (e.g., $V_{SUM\_BUK}$) from the voltage subtractor 982 and generates the pulse-width-modulation signal 914 for the buck mode (e.g., PWM_BUK).

According to certain embodiments, the pulse-width-modulation signal generator 950 includes a comparator 952, a NAND gate 954, a NAND gate 956, and a flip-flop 958. In some examples, the comparator 952 includes an inverting input terminal (e.g., the "−" input terminal), a non-inverting input terminal (e.g., the "+" input terminal), and an output terminal. For example, the inverting input terminal (e.g., the "−" input terminal) of the comparator 952 receives the compensation voltage 971 (e.g., $V_{COMP}$), and the non-inverting input terminal (e.g., the "+" input terminal) of the comparator 952 receives the voltage 951 (e.g., $V_{SUM\_BST}$) from the voltage adder 980. As an example, the output terminal of the comparator 952 outputs a comparison signal 953 (e.g., PWM1). In certain examples, the NAND gate 954 receives the comparison signal 953 (e.g., PWM1) and a signal 955 (e.g., MINON_BST), and generates a logic signal 957. For example, the signal 955 (e.g., MINON_BST) represents a predetermined minimum duration for the switch 856 (e.g., SC) to be closed in the boost mode. In some examples, the NAND gate 956 receives the logic signal 957 and a signal 959 (e.g., MAXON_BST) and generates a logic signal 990. For example, the signal 959 (e.g., MAXON_BST) represents a predetermined maximum duration for the switch 856 (e.g., SC) to be closed in the boost mode. In certain examples, the logic signal 990 is received by an input terminal (e.g., the "R" input terminal) of the flip-flop 958, which includes another input terminal (e.g., the "S" input terminal) that receives a clock signal 992 (e.g., CLK_BST). For example, the flip-flop 958 generates the pulse-width-modulation signal 912 for the boost mode (e.g., PWM_BST) at an output terminal (e.g., the "Q" output terminal).

According to some embodiments, the pulse-width-modulation signal generator 960 includes a comparator 962, a NAND gate 964, a NAND gate 966, and a flip-flop 968. In some examples, the comparator 962 includes an inverting input terminal (e.g., the "−" input terminal), a non-inverting input terminal (e.g., the "+" input terminal), and an output terminal. For example, the inverting input terminal (e.g., the "−" input terminal) of the comparator 962 receives the compensation voltage 971 (e.g., $V_{COMP}$), and the non-inverting input terminal (e.g., the "+" input terminal) of the comparator 962 receives the voltage 961 (e.g., $V_{SUM\_BUK}$) from the voltage subtractor 982. As an example, the output terminal of the comparator 962 outputs a comparison signal 963 (e.g., PWM2). In certain examples, the NAND gate 964 receives the comparison signal 963 (e.g., PWM2) and a signal 965 (e.g., MINON_BUK), and generates a logic signal 967. For example, the signal 965 (e.g., MINON_BUK) represents a predetermined minimum duration for the switch 854 (e.g., SB) to be closed in the buck mode. In some examples, the NAND gate 966 receives the logic signal 967 and a signal 969 (e.g., MAXON_BUK) and generates a logic signal 996. For example, the signal 969 (e.g., MAXON_BUK) represents a predetermined maximum duration for the switch 854 (e.g., SB) to be closed in the buck mode. In certain examples, the logic signal 996 is received by an input terminal (e.g., the "R" input terminal) of the flip-flop 968, which includes another input terminal (e.g., the "S" input terminal) that receives a clock signal 998 (e.g., CLK_BUK). For example, the flip-flop 968 generates the pulse-width-modulation signal 914 for the buck mode (e.g., PWM_BUK) at an output terminal (e.g., the "Q" output terminal).

In certain embodiments, the voltage adder 980 receives the detection signal 762 (e.g., $V_{SNS}$) and a signal 981 (e.g., SLOPE_BST) and generates the voltage 951 (e.g., $V_{SUM\_BST}$) by adding the detection signal 762 (e.g., $V_{SNS}$) and the signal 981 (e.g., SLOPE_BST). For example, the signal 981 (e.g., SLOPE_BST) is a ramp voltage for the boost mode. As an example, the signal 981 (e.g., SLOPE_BST) is used to prevent sub-harmonic oscillation of the power transmitter 600 in the boost mode. In some embodiments, the voltage subtractor 982 receives the detection signal 762 (e.g., $V_{SNS}$) and a signal 983 (e.g., SLOPE_BUK) and generates the voltage 961 (e.g., $V_{SUM\_BUK}$) by subtracting the signal 983 (e.g., SLOPE_BUK) from the detection signal 762 (e.g., $V_{SNS}$). For example, the signal 983 (e.g., SLOPE_BUK) is a ramp voltage for the buck mode. As an example, the signal 983 (e.g., SLOPE_BUK) is used to prevent sub-harmonic oscillation of the power transmitter 600 in the buck mode.

According to some embodiments, the operation mode controller 920 receives the input voltage 612 (e.g., $V_{IN}$), the output voltage 614 (e.g., $V_{OUT}$), the pulse-width-modulation signal 914 for the buck mode (e.g., PWM_BUK), and the pulse-width-modulation signal 912 for the boost mode (e.g., PWM_BST), and generates the logic signal 922 (e.g., BST), the logic signal 924 (e.g., BUK), the logic signal 926 (e.g., BST_ON), and the logic signal 928 (e.g., BUK_ON). In certain examples, the control signal generator 930 receives the logic signal 922 (e.g., BST), the logic signal 924 (e.g., BUK), the logic signal 926 (e.g., BST_ON), and the logic signal 928 (e.g., BUK_ON), and generates the control signals 782, 784, 786 and 788.

FIG. 10A, FIG. 10B, and FIG. 10C are simplified diagrams showing certain operations of the operation mode controller 920 of the voltage controller 770 as part of the DC-to-DC voltage converter 610 as shown in FIG. 9 according to certain embodiments of the present invention. These diagrams are merely examples, which should not unduly limit the scope of the claims. One of ordinary skill in the art would recognize many variations, alternatives, and modifications. As shown in FIG. 9, the operation mode controller 920 receives the input voltage 612 (e.g., $V_{IN}$), the output voltage 614 (e.g., $V_{OUT}$), the pulse-width-modulation signal 914 for the buck mode (e.g., PWM_BUK), and the pulse-width-modulation signal 912 for the boost mode (e.g., PWM_BST), and generates the logic signal 922 (e.g., BST), the logic signal 924 (e.g., BUK), the logic signal 926 (e.g., BST_ON), and the logic signal 928 (e.g., BUK_ON), according to some embodiments.

As shown in FIG. 10A, in certain embodiments, the operation mode controller 920 uses the input voltage 612 (e.g., $V_{IN}$) and the output voltage 614 (e.g., $V_{OUT}$) to generate the logic signal 922 (e.g., BST) and the logic signal 924 (e.g., BUK). As an example, the operation mode controller 920 determines a ratio of the input voltage 612 (e.g., $V_{IN}$) to the output voltage 614 (e.g., $V_{OUT}$) and generates the logic signal 922 (e.g., BST) and the logic signal 924 (e.g., BUK) based at least in part upon the ratio. For example, the logic signal 922 (e.g., BST) and the logic signal 924 (e.g., BUK) are determined by at least the ratio of the input voltage 612 (e.g., $V_{IN}$) to the output voltage 614 (e.g., $V_{OUT}$) as follows:

$$K = \frac{V_{IN}}{V_{OUT}} \qquad \text{(Equation 1)}$$

where K represents the ratio of the input voltage 612 (e.g., $V_{IN}$) to the output voltage 614 (e.g., $V_{OUT}$). Additionally, $V_{IN}$ represents the input voltage 612, and $V_{OUT}$ represents the output voltage 614.

In some examples, when the ratio K increases from a value that is smaller than 0.98 until the ratio K reaches 1.02, the logic signal 922 (e.g., BST) remains at a logic high level (e.g., BST=1), and the logic signal 924 (e.g., BUK) remains at a logic low level (e.g., BUK=0). For example, when the ratio K increases to 1.02, the logic signal 922 (e.g., BST) changes from the logic high level to the logic low level, and the logic signal 924 (e.g., BUK) changes from the logic low level to the logic high level. As an example, when the ratio K increases from 1.02, the logic signal 922 (e.g., BST) remains at the logic low level (e.g., BST=0), and the logic signal 924 (e.g., BUK) remains at the logic high level (e.g., BUK=1).

In certain examples, when the ratio K decreases from a value that is larger than 1.02 until the ratio K reaches 0.98, the logic signal 922 (e.g., BST) remains at the logic low level (e.g., BST=0), and the logic signal 924 (e.g., BUK) remains at the logic high level (e.g., BUK=1). For example, when the ratio K decreases to 0.98, the logic signal 922 (e.g., BST) changes from the logic low level to the logic high level, and the logic signal 924 (e.g., BUK) changes from the logic high level to the logic low level. As an example, when the ratio K decreases from 0.98, the logic signal 922 (e.g., BST) remains at the logic high level (e.g., BST=1), and the logic signal 924 (e.g., BUK) remains at the logic low level (e.g., BUK=0).

As shown in FIG. 10B, in some embodiments, the operation mode controller 920 uses the pulse-width-modulation signal 914 for the buck mode (e.g., PWM_BUK) to generate the logic signal 926 (e.g., BST_ON). For example, the logic signal 926 (e.g., BST_ON) is determined by at least a duty cycle $D_A$ of the pulse-width-modulation signal 914 (e.g., PWM_BUK). In certain examples, when the duty cycle $D_A$ of the pulse-width-modulation signal 914 increases from a value that is smaller than 5% until the duty cycle $D_A$ reaches 15%, the logic signal 926 (e.g., BST_ON) remains at a logic high level (e.g., BST_ON=1). For example, when the duty cycle $D_A$ increases to 15%, the logic signal 926 (e.g., BST_ON) changes from the logic high level to a logic low level. As an example, when the duty cycle $D_A$ increases from 15%, the logic signal 926 (e.g., BST_ON) remains at the logic low level (e.g., BST_ON=0). In some examples, when the duty cycle $D_A$ of the pulse-width-modulation signal 914 decreases from a value that is larger than 15% until the duty cycle $D_A$ reaches 5%, the logic signal 926 (e.g., BST_ON) remains at the logic low level (e.g., BST_ON=0). For example, when the duty cycle $D_A$ decreases to 5%, the logic signal 926 (e.g., BST_ON) changes from the logic low level to the logic high level. As an example, when the duty cycle $D_A$ decreases from 5%, the logic signal 926 (e.g., BST_ON) remains at the logic high level (e.g., BST_ON=1).

As shown in FIG. 10C, in certain embodiments, the operation mode controller 920 uses the pulse-width-modulation signal 912 for the boost mode (e.g., PWM_BST) to generate the logic signal 928 (e.g., BUK_ON). For example, the logic signal 928 (e.g., BUK_ON) is determined by at least a duty cycle $D_B$ of the pulse-width-modulation signal 912 (e.g., PWM_BST). In certain examples, when the duty cycle $D_B$ of the pulse-width-modulation signal 912 increases from a value that is smaller than 5% until the duty cycle $D_B$ reaches 15%, the logic signal 928 (e.g., BUK_ON) remains at a logic high level (e.g., BUK_ON=1). For example, when the duty cycle $D_B$ increases to 15%, the logic signal 928 (e.g., BUK_ON) changes from the logic high level to a logic low level. As an example, when the duty cycle $D_B$ increases from 15%, the logic signal 928 (e.g., BUK_ON) remains at the logic low level (e.g., BUK_ON=0). In some examples, when the duty cycle $D_B$ of the pulse-width-modulation signal 912 decreases from a value that is larger than 15% until the duty cycle $D_B$ reaches 5%, the logic signal 928 (e.g., BUK_ON) remains at the logic low level (e.g., BUK_ON=0). For example, when the duty cycle $D_B$ decreases to 5%, the logic signal 928 (e.g., BUK_ON) changes from the logic low level to the logic high level. As an example, when the duty cycle $D_B$ decreases from 5%, the logic signal 928 (e.g., BUK_ON) remains at the logic high level (e.g., BUK_ON=1).

FIG. 11 is a simplified diagram showing certain components of the control signal generator 930 of the voltage controller 770 as part of the DC-to-DC voltage converter 610 as shown in FIG. 9 according to some embodiments of the present invention. This diagram is merely an example, which should not unduly limit the scope of the claims. One of ordinary skill in the art would recognize many variations, alternatives, and modifications. The control signal generator 930 includes NOT gates 1102 and 1108, a NOR gate 1104, OR gates 1106 and 1110, an AND gate 1112, and drivers 1140 and 1142. Additionally, the control signal generator 930 also includes NOT gates 1122 and 1128, OR gates 1124 and 1132, a NOR gate 1126, an AND gate 1130, and drivers 1144 and 1148. Although the above has been shown using a selected group of components for the control signal generator 930, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the NOT gate 1102 receives the logic signal 922 (e.g., BST) and generates a signal 1101. In some examples, the signal 1101 is received by the NOR gate 1104 and the OR gate 1106, both of which also receive the logic signal 928 (e.g., BUK_ON). For example, the NOR gate 1104 uses the signal 1101 and the logic signal 928 (e.g., BUK_ON) to generate a signal 1103. As an example, the OR gate 1106 uses the signal 1101 and the logic signal 928 (e.g., BUK_ON) to generate a signal 1105. In certain examples, the pulse-width-modulation signal 914 for the buck mode (e.g., PWM_BUK) is received by the AND gate 1112 and the NOT gate 1108. For example, the NOT gate 1108 uses the pulse-width-modulation signal 914 to generate a logic signal 1107. As an example, the OR gate 1110 receives the signals 1103 and 1107 and generate a signal 1109. For example, the AND gate 1112 receives the pulse-width-modulation signal 914 and the signal 1105 and generates a signal 1111. In some examples, the driver 1140 receives the signal 1109 and generates the control signal 782, and the driver 1142 receives the signal 1111 and generates the control signal 784.

According to some embodiments, the NOT gate 1122 receives the logic signal 924 (e.g., BUK) and generates a signal 1121. In some examples, the signal 1121 is received by the OR gate 1124 and the NOR gate 1126, both of which also receive the logic signal 926 (e.g., BST_ON). For example, the OR gate 1124 uses the signal 1121 and the logic signal 926 (e.g., BST_ON) to generate a signal 1123. As an example, the NOR gate 1126 uses the signal 1121 and the logic signal 926 (e.g., BST_ON) to generate a signal 1125. In certain examples, the pulse-width-modulation signal 912 for the boost mode (e.g., PWM_BST) is received by the AND gate 1130 and the NOT gate 1128. For example, the NOT gate 1128 uses the pulse-width-modulation signal 912 to generate a logic signal 1127. As an example, the OR gate 1132 receives the signals 1125 and 1127 and generate a signal 1131. For example, the AND gate 1130 receives the pulse-width-modulation signal 912 and the signal 1123 and generates a signal 1129. In some examples, the driver 1144 receives the signal 1129 and generates the control signal 786, and the driver 1146 receives the signal 1131 and generates the control signal 788.

In certain embodiments, as shown in FIG. 7, the switch network 750 receives the control signals 782, 784, 786 and 788 and uses the control signals 782, 784, 786 and 788 to close or open the multiple switches (e.g., four switches) of the switch network 750. In some embodiments, as shown in FIG. 8, the control signal 782 is used to close or open the switch 852 (e.g., SA), the control signal 784 is used to close or open the switch 854 (e.g., SB), the control signal 786 is used to close or open the switch 856 (e.g., SC), and the control signal 788 is used to close or open the switch 858 (e.g., SD).

As shown in FIG. 7, FIG. 8, FIG. 9 and FIG. 11, the DC-to-DC voltage converter 610 is an in-phase buck-boost converter that includes the switches 852, 854, 856, and 858 according to some embodiments. For example, the relationship between the input voltage 612 (e.g., $V_{IN}$) and the output voltage 614 (e.g., $V_{OUT}$) is obtained based on the volt-second balance principle. As an example, the output voltage 614 is determined as follows:

$$V_{OUT} = \frac{t_{AC} + t_{AD}}{t_{BD} + t_{AD}} \times V_{IN} \quad \text{(Equation 2)}$$

wherein $V_{OUT}$ represents the output voltage 614, and $V_{IN}$ represents the input voltage 612. Additionally, $t_{AC}$ represents, within one switching cycle, the time duration during which both the switch 852 (e.g., SA) and the switch 856 (e.g., SC) are closed. Moreover, $t_{AD}$ represents, within one switching cycle, the time duration during which both the switch 852 (e.g., SA) and the switch 858 (e.g., SD) are closed. Also, $t_{BD}$ represents, within one switching cycle, the time duration during which both the switch 854 (e.g., SB) and the switch 858 (e.g., SD) are closed.

In certain embodiments, if the logic signal 922 (e.g., BST) is at the logic high level, the logic signal 924 (e.g., BUK) is at the logic low level, and the logic signal 928 (e.g., BUK_ON) is at the logic low level, regardless of whether the logic signal 926 (e.g., BST_ON) is at the logic high level or at the logic low level, the DC-to-DC voltage converter 610 works in the boost mode. For example, in the boost mode, throughout an entire switching cycle, the control signal 782 is used to keep the switch 852 (e.g., SA) closed, the control signal 784 is used to keep the switch 854 (e.g., SB) open, and the switch 856 (e.g., SC) and the switch 858 (e.g., SD) are sometimes closed and sometimes open, but the switch 856 (e.g., SC) and the switch 858 (e.g., SD) are not allowed to be closed at the same time. As an example, in the boost mode, the output voltage 614 is larger than the input voltage 612 and is determined as follows:

$$V_{OUT} = \frac{t_{AC} + t_{AD}}{t_{AD}} \times V_{IN} \quad \text{(Equation 3)}$$

wherein $V_{OUT}$ represents the output voltage 614, and $V_{IN}$ represents the input voltage 612. Additionally, $t_{AC}$ represents, within one switching cycle, the time duration during which both the switch 852 (e.g., SA) and the switch 856 (e.g., SC) are closed. Moreover, $t_{AD}$ represents, within one switching cycle, the time duration during which both the switch 852 (e.g., SA) and the switch 858 (e.g., SD) are closed.

In some embodiments, if the logic signal 922 (e.g., BST) is at the logic low level, the logic signal 924 (e.g., BUK) is at the logic high level, and the logic signal 926 (e.g., BST_ON) is at the logic low level, regardless of whether the logic signal 928 (e.g., BUK_ON) is at the logic high level or at the logic low level, the DC-to-DC voltage converter 610 works in the buck mode. For example, in the buck mode, throughout an entire switching cycle, the control signal 788 is used to keep the switch 858 (e.g., SD) closed, the control signal 786 is used to keep the switch 856 (e.g., SC) open, and the switch 852 (e.g., SA) and the switch 854 (e.g., SB) are sometimes closed and sometimes open, but the switch 852 (e.g., SA) and the switch 854 (e.g., SB) are not allowed to be closed at the same time. As an example, in the buck mode, the output voltage 614 is smaller than the input voltage 612 and is determined as follows:

$$V_{OUT} = \frac{t_{AD}}{t_{BD} + t_{AD}} \times V_{IN} \quad \text{(Equation 4)}$$

wherein $V_{OUT}$ represents the output voltage 614, and $V_{IN}$ represents the input voltage 612. Moreover, $t_{AD}$ represents, within one switching cycle, the time duration during which both the switch 852 (e.g., SA) and the switch 858 (e.g., SD) are closed. Also, $t_{BD}$ represents, within one switching cycle, the time duration during which both the switch 854 (e.g., SB) and the switch 858 (e.g., SD) are closed.

According to certain embodiments, the operation modes of the DC-to-DC voltage converter 610 include the boost mode, the buck mode, and a mode for the input voltage 612 (e.g., $V_{IN}$) and the output voltage 614 (e.g., $V_{OUT}$) being approximately equal. As an example, in the mode for the input voltage 612 (e.g., $V_{IN}$) and the output voltage 614 (e.g., $V_{OUT}$) being approximately equal, the input voltage 612 (e.g., $V_{IN}$) and the output voltage 614 (e.g., $V_{OUT}$) are equal. For example, in the mode for the input voltage 612 (e.g., $V_{IN}$) and the output voltage 614 (e.g., $V_{OUT}$) being approximately equal, the input voltage 612 (e.g., $V_{IN}$) and the output voltage 614 (e.g., $V_{OUT}$) are approximately equal within ±10%. As an example, in the mode for the input voltage 612 (e.g., $V_{IN}$) and the output voltage 614 (e.g., $V_{OUT}$) being approximately equal, the input voltage 612 (e.g., $V_{IN}$) and the output voltage 614 (e.g., $V_{OUT}$) are approximately equal within ±20%. In some examples, in the boost mode, the output voltage 614 (e.g., $V_{OUT}$) is larger than the input voltage 612 (e.g., $V_{IN}$). In certain examples, in the buck mode, the output voltage 614 (e.g., $V_{OUT}$) is smaller than the input voltage 612 (e.g., $V_{IN}$).

According to some embodiments, whether the DC-to-DC voltage converter 610 operates in the boost mode, in the buck mode, or in the mode for the input voltage 612 (e.g., $V_{IN}$) and the output voltage 614 (e.g., $V_{OUT}$) being approximately equal is represented by the logic level of the logic signal 922 (e.g., BST), the logic level of the logic signal 924 (e.g., BUK), the logic level of the logic signal 926 (e.g., BST_ON), and/or the logic level of the logic signal 928 (e.g., BUK_ON).

In some examples, if the logic signal 922 (e.g., BST) is at the logic high level, the logic signal 924 (e.g., BUK) is at the logic low level, and the logic signal 928 (e.g., BUK_ON) is at the logic high level, regardless of whether the logic signal 926 (e.g., BST_ON) is at the logic high level or at the logic low level, the DC-to-DC voltage converter 610 works in the mode for the input voltage 612 (e.g., $V_{IN}$) and the output voltage 614 (e.g., $V_{OUT}$) being approximately equal. For example, in the mode for the input voltage 612 (e.g., $V_{IN}$) and the output voltage 614 (e.g., $V_{OUT}$) being approximately equal, during an entire switching cycle, the control signal 784 is used to make the switch 854 (e.g., SB) closed for only a predetermined minimum duration. As an example, in the mode for the input voltage 612 (e.g., $V_{IN}$) and the output voltage 614 (e.g., $V_{OUT}$) being approximately equal, the output voltage 614 is determined as follows:

$$V_{OUT} = \frac{t_{AC} + t_{AD}}{t_{BD(min)} + t_{AD}} \times V_{IN} \quad \text{(Equation 5)}$$

wherein $V_{OUT}$ represents the output voltage 614, and $V_{IN}$ represents the input voltage 612. Additionally, $t_{AC}$ represents, within one switching cycle, the time duration during which both the switch 852 (e.g., SA) and the switch 856 (e.g., SC) are closed. Moreover, $t_{AD}$ represents, within one switching cycle, the time duration during which both the switch 852 (e.g., SA) and the switch 858 (e.g., SD) are closed. Also, $t_{BD(min)}$ represents, within one switching cycle, the time duration during which both the switch 854 (e.g., SB) and the switch 858 (e.g., SD) are closed, given that the switch 854 (e.g., SB) is closed for only the predetermined minimum duration during the switching cycle.

In certain examples, if the logic signal 926 (e.g., BST_ON) is at the logic high level and the logic signal 928 (e.g., BUK_ON) is also at the logic high level, regardless of whether the logic signal 922 (e.g., BST) is at the logic high level or at the logic low level and regardless of whether the logic signal 924 (e.g., BUK) is at the logic high level or at the logic low level, the DC-to-DC voltage converter 610 works in the mode for the input voltage 612 (e.g., $V_{IN}$) and the output voltage 614 (e.g., $V_{OUT}$) being approximately equal. For example, in the mode for the input voltage 612 (e.g., $V_{IN}$) and the output voltage 614 (e.g., $V_{OUT}$) being approximately equal, during an entire switching cycle, the control signal 784 is used to make the switch 854 (e.g., SB) closed for only a predetermined minimum duration and make the switch 856 (e.g., SC) closed for only a predetermined minimum duration. For example, if the logic signal 922 (e.g., BST) is at the logic high level, the logic signal 924 (e.g., BUK) is at the logic low level, and if the logic signal 922 (e.g., BST) is at the logic low level, the logic signal 924 (e.g., BUK) is at the logic high level. As an example, in the mode for the input voltage 612 (e.g., $V_{IN}$) and the output voltage 614 (e.g., $V_{OUT}$) being approximately equal, the output voltage 614 is determined as follows:

$$V_{OUT} = \frac{t_{AC(min)} + t_{AD}}{t_{BD(min)} + t_{AD}} \times V_{IN} \quad \text{(Equation 6)}$$

wherein $V_{OUT}$ represents the output voltage 614, and $V_{IN}$ represents the input voltage 612. Additionally, $t_{AC(min)}$ represents, within one switching cycle, the time duration during which both the switch 852 (e.g., SA) and the switch 856 (e.g., SC) are closed, given that the switch 856 (e.g., SC) is closed for only the predetermined minimum duration for the switch 856 (e.g., SC) during the switching cycle. Moreover, $t_{AD}$ represents, within one switching cycle, the time duration during which both the switch 852 (e.g., SA) and the switch 858 (e.g., SD) are closed. Also, $t_{BD(min)}$ represents, within one switching cycle, the time duration during which both the switch 854 (e.g., SB) and the switch 858 (e.g., SD) are closed, given that the switch 854 (e.g., SB) is closed for only the predetermined minimum duration for the switch 854 (e.g., SB) during the switching cycle. As an example, $t_{AC(min)}$ and $t_{BD(min)}$ are equal.

In certain examples, if the logic signal 926 (e.g., BST_ON) is at the logic high level, the logic signal 924 (e.g., BUK) is at the logic high level, and the logic signal 922 (e.g., BST) is at the logic low level, regardless of whether the logic signal 928 (e.g., BUK_ON) is at the logic high level or at the logic low level, the DC-to-DC voltage converter 610 works in the mode for the input voltage 612 (e.g., $V_{IN}$) and the output voltage 614 (e.g., $V_{OUT}$) being approximately equal. For example, in the mode for the input voltage 612 (e.g., $V_{IN}$) and the output voltage 614 (e.g., $V_{OUT}$) being approximately equal, during an entire switching cycle, the control signal 784 is used to make the switch 856 (e.g., SC) closed for only a predetermined minimum duration. As an example, in the mode for the input voltage 612 (e.g., $V_{IN}$) and the output voltage 614 (e.g., $V_{OUT}$) being approximately equal, the output voltage 614 is determined as follows:

$$V_{OUT} = \frac{t_{AC(min)} + t_{AD}}{t_{BD} + t_{AD}} \times V_{IN} \quad \text{(Equation 7)}$$

wherein $V_{OUT}$ represents the output voltage 614, and $V_{IN}$ represents the input voltage 612. Additionally, $t_{AC(min)}$ represents, within one switching cycle, the time duration during which both the switch 852 (e.g., SA) and the switch 856 (e.g., SC) are closed, given that the switch 856 (e.g., SC) is closed for only the predetermined minimum duration during the switching cycle. Moreover, $t_{AD}$ represents, within one switching cycle, the time duration during which both the switch 852 (e.g., SA) and the switch 858 (e.g., SD) are closed. Also, $t_{BD}$ represents, within one switching cycle, the time duration during which both the switch 854 (e.g., SB) and the switch 858 (e.g., SD) are closed.

FIG. 12 is a simplified timing diagram showing the DC-to-DC voltage converter 610 as shown in FIG. 7, FIG. 8, FIG. 9 and FIG. 11 according to some embodiments of the present invention. This diagram is merely an example, which should not unduly limit the scope of the claims. One of ordinary skill in the art would recognize many variations, alternatives, and modifications. The waveform 1292 represents the clock signal 992 (e.g., CLK_BST) as a function of time, the waveform 1298 represents the clock signal 998 (e.g., CLK_BUK) as a function of time, the waveform 1214 represents the output voltage 614 (e.g., $V_{OUT}$) as a function of time, and the waveform 1212 represents the input voltage 612 (e.g., $V_{IN}$) as a function of time. Additionally, the waveform 1262 represents the detection signal 762 (e.g., $V_{SNS}$) as a function of time, the waveform 1271 represents the compensation voltage 971 (e.g., $V_{COMP}$) as a function of time, the waveform 1251 represents the voltage 951 (e.g., $V_{SUM\_BST}$) as a function of time, and the waveform 1261 represents the voltage 961 (e.g., $V_{SUM\_BUK}$) as a function of time. Moreover, the waveform 1282 represents the control signal 782 as a function of time, the waveform 1284 represents the control signal 784 as a function of time, the waveform 1286 represents the control signal 786 as a function of time, and the waveform 1288 represents the control signal 788 as a function of time. In certain embodiments, as shown by the waveforms 1292 and 1298, the clock signal 992 (e.g., CLK_BST) and the clock signal 998 (e.g., CLK_BUK) have the same frequency but with a phase shift. For example, the phase shift is equal to a value that is larger than or equal to 120° but smaller than or equal to 240°.

According to some embodiments, from time $t_1$ to time $t_3$, the logic signal 922 (e.g., BST) is at the logic high level, the logic signal 924 (e.g., BUK) is at the logic low level, and the logic signal 928 (e.g., BUK_ON) is at the logic low level, indicating that the DC-to-DC voltage converter 610 works in the boost mode. For example, as shown in FIG. 12, mode A represents the boost mode. As an example, from time $t_1$ to time $t_3$, the output voltage 614 (e.g., $V_{OUT}$) is larger than the input voltage 612 (e.g., $V_{IN}$) as shown by the waveforms 1212 and 1214. In certain examples, at time $t_1$, which corresponds to a rising edge of the clock signal 992 (e.g., CLK_BST) as shown by the waveform 1292, the switch 856 (e.g., SC) is closed by the control signal 786 as shown by the waveform 1286. In some examples, at time $t_2$, the voltage 951 (e.g., $V_{SUM\_BST}$) becomes larger than the compensation voltage 971 (e.g., $V_{COMP}$) as shown by the waveforms 1251 and 1271. For example, at time $t_2$, the switch 856 (e.g., SC) becomes open by the control signal 786 as shown by the waveform 1286, and also at time $t_2$, the switch 858 (e.g., SD) becomes closed by the control signal 788 as shown by the waveform 1288. As an example, from time $t_3$ to time $t_4$, the switch 858 (e.g., SD) remains closed, and at time $t_4$, the switch 858 (e.g., SD) becomes open by the control signal 788 as shown by the waveform 1288.

According to certain embodiments, from time $t_3$ to time $t_{13}$, the DC-to-DC voltage converter 610 works in the mode for the input voltage 612 (e.g., $V_{IN}$) and the output voltage 614 (e.g., $V_{OUT}$) being approximately equal. For example, as shown in FIG. 12, mode B represents the mode for the input voltage 612 (e.g., $V_{IN}$) and the output voltage 614 (e.g., $V_{OUT}$) being approximately equal. As an example, from time $t_3$ to time $t_{13}$, the input voltage 612 (e.g., $V_{IN}$) and the output voltage 614 (e.g., $V_{OUT}$) are approximately equal (e.g., being equal, being approximately equal within ±10%, or being approximately equal within ±20%).

In some examples, at time $t_3$, the duty cycle of the pulse-width-modulation signal 912 (e.g., PWM_BST) becomes smaller than 5%, the logic signal 928 (e.g., BUK_ON) changes from the logic low level to the logic high level, and the DC-to-DC voltage converter 610 enters the mode for the input voltage 612 (e.g., $V_{IN}$) and the output voltage 614 (e.g., $V_{OUT}$) being approximately equal. For example, at time $t_3$, the switch 856 (e.g., SC) becomes closed, and after time $t_3$, the switch 856 (e.g., SC) remains closed until at least the voltage 951 (e.g., $V_{SUM\_BST}$) becomes larger than the compensation voltage 971 (e.g., $V_{COMP}$). As an example, if the voltage 951 (e.g., $V_{SUM\_BST}$) becomes larger than the compensation voltage 971 (e.g., $V_{COMP}$) when the switch 856 (e.g., SC) has remained closed for at least a predetermined minimum duration (e.g., $t_{AC(min)}$), the switch 856 (e.g., SC) becomes open. For example, if the voltage 951 (e.g., $V_{SUM\_BST}$) becomes larger than the compensation voltage 971 (e.g., $V_{COMP}$) before the switch 856 (e.g., SC) has remained closed for at least the predetermined minimum duration (e.g., $t_{AC(min)}$), the switch 856 (e.g., SC) remains closed and then becomes open when the predetermined minimum duration (e.g., $t_{AC(min)}$) has been reached (e.g., at time $t_4$). In certain examples, at time $t_4$, the switch 856 (e.g., SC) is opened by the control signal 786 and the switch 858 (e.g., SD) is closed by the control signal 788 as shown by the waveforms 1286 and 1288 respectively.

In some examples, at time $t_5$, which corresponds to a rising edge of the clock signal 998 (e.g., CLK_BUK) as shown by the waveform 1298, the switch 854 (e.g., SB) is closed by the control signal 784 as shown by the waveform 1284. As an example, from time $t_5$ to time $t_6$, the switch 854 (e.g., SB) remines closed for a predetermined minimum duration (e.g., $t_{BD(min)}$). In certain examples, at time $t_6$, the switch 854 (e.g., SB) becomes open by the control signal 784 as shown by the waveform 1284, and the switch 852 (e.g., SA) becomes closed by the control signal 782 as shown by the waveform 1282.

In some examples, at time $t_7$, which corresponds to a rising edge of the clock signal 992 (e.g., CLK_BST) as shown by the waveform 1292, the switch 856 (e.g., SC) is closed by the control signal 786 as shown by the waveform 1286. As an example, from time $t_7$ to time $t_8$, the switch 856 (e.g., SC) remines closed for a predetermined minimum duration (e.g., $t_{AC(min)}$). In certain examples, at time $t_8$, the switch 856 (e.g., SC) becomes open by the control signal 786 as shown by the waveform 1286, and the switch 858 (e.g., SD) becomes closed by the control signal 788 as shown by the waveform 1288.

In some examples, at time $t_9$, which corresponds to a rising edge of the clock signal 998 (e.g., CLK_BUK) as shown by the waveform 1298, the switch 854 (e.g., SB) is closed by the control signal 784 as shown by the waveform 1284. As an example, from time $t_9$ to time $t_{10}$, the switch 854 (e.g., SB) remines closed for a predetermined minimum duration (e.g., $t_{BD(min)}$). In certain examples, at time $t_{10}$, the switch 854 (e.g., SB) becomes open by the control signal 784 as shown by the waveform 1284, and the switch 852 (e.g., SA) becomes closed by the control signal 782 as shown by the waveform 1282.

In some examples, at time $t_{11}$, which corresponds to a rising edge of the clock signal 992 (e.g., CLK_BST) as shown by the waveform 1292, the switch 856 (e.g., SC) is closed by the control signal 786 as shown by the waveform 1286. As an example, from time $t_{11}$ to time $t_{12}$, the switch 856 (e.g., SC) remines closed for a predetermined minimum duration (e.g., $t_{AC(min)}$). In certain examples, at time $t_{12}$, the switch 856 (e.g., SC) becomes open by the control signal 786 as shown by the waveform 1286, and the switch 858 (e.g., SD) becomes closed by the control signal 788 as shown by the waveform 1288.

According to some embodiments, from time $t_{13}$ to time $t_{15}$, the logic signal 922 (e.g., BST) is at the logic low level, the logic signal 924 (e.g., BUK) is at the logic high level, and the logic signal 926 (e.g., BST_ON) is at the logic low level, indicating that the DC-to-DC voltage converter 610 works in the buck mode. For example, as shown in FIG. 12, mode C represents the boost mode. As an example, from time $t_{13}$ to time $t_{15}$, the output voltage 614 (e.g., $V_{OUT}$) is larger than the input voltage 612 (e.g., $V_{IN}$) as shown by the waveforms 1212 and 1214. In certain examples, at time $t_{13}$, which corresponds to a rising edge of the clock signal 998 (e.g., CLK_BUK) as shown by the waveform 1298, the switch 854 (e.g., SB) is closed by the control signal 784 as shown by the waveform 1284. For example, at time $t_{13}$, the duty cycle of the pulse-width-modulation signal 914 (e.g., PWM_BUK) becomes larger than 5%, the logic signal 926 (e.g., BST_ON) changes from the logic high level to the logic low level, and the DC-to-DC voltage converter 610 enters the buck mode. In some examples, at time $t_{14}$, the voltage 961 (e.g., $V_{SUM\_BUK}$) becomes smaller than the compensation voltage 971 (e.g., $V_{COMP}$) as shown by the waveforms 1261 and 1271. For example, at time $t_{14}$, the switch 854 (e.g., SB) becomes open by the control signal 784 as shown by the waveform 1284, and also at time $t_{14}$, the switch 852 (e.g., SA) becomes closed by the control signal 782 as shown by the waveform 1282. As an example, from time $t_{14}$ to time $t_{15}$, the switch 852 (e.g., SA) remains closed. In certain examples, at time $t_{15}$, which corresponds to a rising edge of the clock signal 998 (e.g., CLK_BUK) as shown by the waveform 1298, the switch 852 (e.g., SA) becomes open by the control signal 782.

As discussed above and further emphasized here, FIG. 12 is merely an example, which should not unduly limit the scope of the claims. One of ordinary skill in the art would recognize many variations, alternatives, and modifications. For example, the timing diagram shows that the DC-to-DC voltage converter 610 changes from the boost made to the mode for the input voltage 612 (e.g., $V_{IN}$) and the output voltage 614 (e.g., $V_{OUT}$) being approximately equal and then changes to the buck mode. As an example, the timing diagram shows that the DC-to-DC voltage converter 610 changes from the buck made to the mode for the input voltage 612 (e.g., $V_{IN}$) and the output voltage 614 (e.g., $V_{OUT}$) being approximately equal and then changes to the boost mode.

FIG. 13 is a simplified timing diagram showing the DC-to-DC voltage converter 610 as shown in FIG. 7, FIG. 8, FIG. 9 and FIG. 11 according to certain embodiments of the present invention. This diagram is merely an example, which should not unduly limit the scope of the claims. One of ordinary skill in the art would recognize many variations, alternatives, and modifications. The waveform 1312 represents the input voltage 612 (e.g., $V_{IN}$) as a function of time, and the waveform 1314 represents the output voltage 614 (e.g., $V_{OUT}$) as a function of time. Additionally, the waveform 1332 represents a voltage at the node 832 (e.g., SW1) as a function of time, and the waveform 1334 represents a voltage at the node 834 (e.g., SW2) as a function of time. Moreover, the waveform 1336 represents the coil current 836 (e.g., $I_L$) as a function of time.

In some embodiments, as shown in FIG. 14, mode X represents the buck mode, mode Y represents the mode for the input voltage 612 (e.g., $V_{IN}$) and the output voltage 614 (e.g., $V_{OUT}$) being approximately equal, and mode Z represents the boost mode. For example, the DC-to-DC voltage converter 610 changes from the buck mode to the mode for the input voltage 612 (e.g., $V_{IN}$) and the output voltage 614 (e.g., $V_{OUT}$) being approximately equal, changes from the mode for the input voltage 612 (e.g., $V_{IN}$) and the output voltage 614 (e.g., $V_{OUT}$) being approximately equal to the boost mode, changes from the boost mode to the mode for the input voltage 612 (e.g., $V_{IN}$) and the output voltage 614 (e.g., $V_{OUT}$) being approximately equal, changes from the mode for the input voltage 612 (e.g., $V_{IN}$) and the output voltage 614 (e.g., $V_{OUT}$) being approximately equal to the buck mode. In certain embodiments, the DC-to-DC voltage converter 610 is in compliance with USB Power Delivery (USB PD) according to some embodiments. For example, the input voltage 612 (e.g., $V_{IN}$) remains at 12 volts as shown by the waveform 1312. As an example, the output voltage 614 (e.g., $V_{OUT}$) is equal to 5 volts, 9 volts, 15 volts, or 20 volts as shown by the waveform 1314, with a load current of 5 amps.

FIG. 14 is a simplified timing diagram showing the DC-to-DC voltage converter 610 as shown in FIG. 7, FIG. 8, FIG. 9 and FIG. 11 according to some embodiments of the present invention. This diagram is merely an example, which should not unduly limit the scope of the claims. One of ordinary skill in the art would recognize many variations, alternatives, and modifications. The waveform 1412 represents the input voltage 612 (e.g., $V_{IN}$) as a function of time, and the waveform 1414 represents the output voltage 614 (e.g., $V_{OUT}$) as a function of time. Additionally, the waveform 1432 represents a voltage at the node 832 (e.g., SW1) as a function of time, and the waveform 1434 represents a voltage at the node 834 (e.g., SW2) as a function of time. Moreover, the waveform 1436 represents the coil current 836 (e.g., $I_L$) as a function of time.

In some embodiments, as shown in FIG. 15, mode J represents the boost mode, mode K represents the mode for the input voltage 612 (e.g., $V_{IN}$) and the output voltage 614 (e.g., $V_{OUT}$) being approximately equal, and mode L represents the buck mode. For example, the DC-to-DC voltage converter 610 changes from the boost mode to the mode for the input voltage 612 (e.g., $V_{IN}$) and the output voltage 614 (e.g., $V_{OUT}$) being approximately equal, changes from the mode for the input voltage 612 (e.g., $V_{IN}$) and the output voltage 614 (e.g., $V_{OUT}$) being approximately equal to the buck mode, changes from the buck mode to the mode for the input voltage 612 (e.g., $V_{IN}$) and the output voltage 614 (e.g., $V_{OUT}$) being approximately equal, changes from the mode for the input voltage 612 (e.g., $V_{IN}$) and the output voltage 614 (e.g., $V_{OUT}$) being approximately equal to the boost mode. In certain embodiments, the DC-to-DC voltage converter 610 is used for power supply in an automobile according to some embodiments. For example, the input voltage 612 (e.g., $V_{IN}$) changes between 4 volts and 36 volts as shown by the waveform 1412. As an example, the output voltage 614 (e.g., $V_{OUT}$) remains at 12 volts as shown by the waveform 1414, with a load current of 5 amps. In certain embodiments, the DC-to-DC voltage converter 610 changes from the boost mode to the mode for the input voltage 612 (e.g., $V_{IN}$) and the output voltage 614 (e.g., $V_{OUT}$) being approximately equal, changes from the mode for the input voltage 612 (e.g., $V_{IN}$) and the output voltage 614 (e.g., $V_{OUT}$) being approximately equal to the buck mode, changes from the buck mode to the mode for the input voltage 612 (e.g., $V_{IN}$) and the output voltage 614 (e.g., $V_{OUT}$) being approximately equal, changes from the mode for the input voltage 612 (e.g., $V_{IN}$) and the output voltage 614 (e.g., $V_{OUT}$) being approximately equal to the boost mode.

FIG. 15 is a simplified diagram showing certain components of the DC-to-DC voltage converter 610 as shown in FIG. 7 according to some embodiments of the present invention. This diagram is merely an example, which should not unduly limit the scope of the claims. One of ordinary skill in the art would recognize many variations, alternatives, and modifications. As an example, the switch network 750 includes the input terminal 792 and the output terminal 794, and also includes a switch 1552, a switch 1554, a switch 1556, and a switch 1558. For example, the current detector 760 includes a current sensing resistor 1560 and a current sampling amplifier 1570. Although the above has been shown using a selected group of components for the DC-to-DC voltage converter 610, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the switch 1552 (e.g., SA), the current sensing resistor 1560, the coil 730, and the switch 1558 (e.g., SD) are connected in series. In some examples, one terminal of the switch 1552 (e.g., SA) is connected to the input terminal 792 that receives the input voltage 612 (e.g., $V_{IN}$), and another terminal of the switch 1552 (e.g., SA) is connected to one terminal of the current sensing resistor 1560 and one terminal of the switch 1554 (e.g., SB) through a node 1532 (e.g., SW1). For example, another terminal of the switch 1554 (e.g., SB) is biased to the ground voltage. In certain examples, one terminal of the switch 1558 (e.g., SD) is connected to the output terminal 794 that outputs the output voltage 614 (e.g., $V_{OUT}$), and another terminal of the switch 1558 (e.g., SD) is connected to one terminal of the coil 730 and one terminal of the switch 1556 (e.g., SC) through a node 1534 (e.g., SW2). As an example, another terminal of the switch 1556 (e.g., SC) is biased to the ground voltage. For example, another terminal of the coil 730 is connected to another terminal of the current sensing resistor 1560. In some examples, a coil current 1536 (e.g., $I_L$) flows through the coil 730 as shown in FIG. 15. For example, the current sensing resistor 1560 allows the coil current 1536 (e.g., $I_L$) to flow through the current sensing resistor 1560.

According to some embodiments, the control signal 782 is used to close or open the switch 1552 (e.g., SA), the control signal 784 is used to close or open the switch 1554 (e.g., SB), the control signal 786 is used to close or open the switch 1556 (e.g., SC), and the control signal 788 is used to close or open the switch 1558 (e.g., SD). For example, under certain condition, both the switch 1552 (e.g., SA) and the switch 1558 (e.g., SD) are closed, so that a current flows from the input terminal 792 to the output terminal 794 through the switch 1552 (e.g., SA), the current sensing resistor 1560, the coil 730, and the switch 1558 (e.g., SD). As an example, allowing both the switch 1552 (e.g., SA) and the switch 1558 (e.g., SD) to be closed at the same time reduces the average magnitude of the coil current 1536 (e.g., $I_L$) that flows through the coil 730 and also lowers the conduction loss.

In some embodiments, the current sampling amplifier 1570 (e.g., ACS) includes an input terminal 1572, an input terminal 1574, and an output terminal 1576. For example, the input terminal 1572 is connected to one terminal of the current sensing resistor 1560, and the input terminal 1574 is connected to another terminal of the current sensing resistor 1560. As an example, the output terminal 1576 outputs the detection signal 762.

In certain embodiments, the current sensing resistor 1560 converts the coil current 1536 (e.g., $I_L$), which flows through the coil 730, to a voltage difference across the current sensing resistor 1560. For example, the voltage difference across the current sensing resistor 1560 is equal to a voltage difference between the input terminal 1572 and the input terminal 1574. As an example, the voltage difference between the input terminal 1572 and the input terminal 1574 is used by the current sampling amplifier 1570 (e.g., ACS) to generate the detection signal 762 at the output terminal 1576.

According to some embodiments, the detection signal 762 represents an amplified magnitude of the coil current 1536 during multiple switching cycles. For example, the detection signal 762 (e.g., $V_{SNS}$) represents the amplified magnitude of the coil current 1536 during one switching cycle, and then the detection signal 762 (e.g., $V_{SNS}$) represents the amplified magnitude of the coil current 1536 during another entire switching cycle. As an example, each switching cycle includes one half switching cycle during which both the switch 1552 (e.g., SA) and the switch 1556 (e.g., SC) are closed and both the switch 1554 (e.g., SB) and the switch 1558 (e.g., SD) are open, and also includes another half switching cycle during which both the switch 1552 (e.g., SA) and the switch 1556 (e.g., SC) are open and both the switch 1554 (e.g., SB) and the switch 1558 (e.g., SD) are closed.

As discussed above, FIG. 15 is a simplified diagram showing certain components of the DC-to-DC voltage converter 610 as shown in FIG. 7 according to some embodiments of the present invention. For example, the DC-to-DC voltage converter 610 as shown in FIG. 7 includes certain components as shown in FIG. 15 and also certain components of the voltage controller 770 as shown in FIG. 9 and/or FIG. 11.

FIG. 16 is a simplified diagram showing certain components of the DC-to-DC voltage converter 610 as shown in FIG. 7 according to certain embodiments of the present invention. This diagram is merely an example, which should not unduly limit the scope of the claims. One of ordinary skill in the art would recognize many variations, alternatives, and modifications. As an example, the switch network 750 includes the input terminal 792 and the output terminal 794, and also includes a switch 1652, a switch 1654, a switch 1656, and a switch 1658. For example, the current detector 760 includes a current sensing resistor 1660 and a current sampling amplifier 1670. Although the above has been shown using a selected group of components for the DC-to-DC voltage converter 610, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the switch 1652 (e.g., SA), the coil 730, and the switch 1658 (e.g., SD) are connected in series. In some examples, one terminal of the switch 1652 (e.g., SA) is connected to the input terminal 792 that receives the input voltage 612 (e.g., $V_{IN}$), and another terminal of the switch 1652 (e.g., SA) is connected to one terminal of the coil 730 and one terminal of the switch 1654 (e.g., SB) through a node 1632 (e.g., SW1). In certain examples, one terminal of the switch 1658 (e.g., SD) is connected to the output terminal 794 that outputs the output voltage 614 (e.g., $V_{OUT}$), and another terminal of the switch 1658 (e.g., SD) is connected to another terminal of the coil 730 and one terminal of the switch 1656 (e.g., SC) through a node 1634 (e.g., SW2). In some examples, a coil current 1636 (e.g., $I_L$) flows through the coil 730 as shown in FIG. 16. For example, the current sensing resistor 1660 allows the coil current 1636 (e.g., $I_L$) to flow through the current sensing resistor 1660.

In certain embodiments, the current sampling amplifier 1670 (e.g., ACS) includes an input terminal 1672, an input terminal 1674, and an output terminal 1676. For example, another terminal of the switch 1654 (e.g., SB) and another terminal of the switch 1656 (e.g., SC) are connected to the input terminal 1672 of the current sampling amplifier 1670 (e.g., ACS) and one terminal of the current sensing resistor 1660. As an example, another terminal of the current sensing resistor 1660 is connected to the input terminal 1674 of the current sampling amplifier 1670 (e.g., ACS) and is biased to the ground voltage. In certain examples, the output terminal 1676 of the current sampling amplifier 1670 (e.g., ACS) outputs the detection signal 762.

In some embodiments, the control signal 782 is used to close or open the switch 1652 (e.g., SA), the control signal 784 is used to close or open the switch 1654 (e.g., SB), the control signal 786 is used to close or open the switch 1656 (e.g., SC), and the control signal 788 is used to close or open the switch 1658 (e.g., SD). For example, both the switch 1652 (e.g., SA) and the switch 1656 (e.g., SC) are closed and both the switch 1654 (e.g., SB) and the switch 1658 (e.g., SD) are open. As an example, both the switch 1652 (e.g., SA) and the switch 1656 (e.g., SC) are open and both the switch 1654 (e.g., SB) and the switch 1658 (e.g., SD) are closed.

According to certain embodiments, the detection signal 762 represents an amplified magnitude of the coil current 1636 during multiple half switching cycles. For example, the detection signal 762 (e.g., $V_{SNS\_BST}$) represents the amplified magnitude of the coil current 1636 during one half switching cycle, and then the detection signal 762 (e.g., $V_{SNS\_BUK}$) represents the amplified magnitude of the coil current 1636 during another half switching cycle. As an example, the one half switching cycle corresponds to a time duration during which both the switch 1652 (e.g., SA) and the switch 1656 (e.g., SC) are closed and both the switch 1654 (e.g., SB) and the switch 1658 (e.g., SD) are open, and the another half switching cycle corresponds to a time duration during which both the switch 1652 (e.g., SA) and the switch 1656 (e.g., SC) are open and both the switch 1654 (e.g., SB) and the switch 1658 (e.g., SD) are closed.

As discussed above, FIG. 16 is a simplified diagram showing certain components of the DC-to-DC voltage converter 610 as shown in FIG. 7 according to some embodiments of the present invention. For example, the DC-to-DC voltage converter 610 as shown in FIG. 7 includes certain components as shown in FIG. 16 and also certain components of the voltage controller 770 as shown in FIG. 9 and/or FIG. 11.

FIG. 17 is a simplified diagram showing certain components of the DC-to-DC voltage converter 610 as shown in FIG. 7 according to some embodiments of the present invention. This diagram is merely an example, which should not unduly limit the scope of the claims. One of ordinary skill in the art would recognize many variations, alternatives, and modifications. As an example, the switch network 750 includes the input terminal 792 and the output terminal 794, and also includes a switch 1752, a switch 1754, a switch 1756, and a switch 1758. For example, the current detector 760 includes current sensing resistors 1760 and 1762 and current sampling amplifiers 1770 and 1780. Although the above has been shown using a selected group of components for the DC-to-DC voltage converter 610, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the current sampling amplifier 1770 includes an input terminal 1772, an input terminal 1774, and an output terminal 1776, and the current sampling amplifier 1780 includes an input terminal 1782, an input terminal 1784, and an output terminal 1786. For example, the output terminal 1776 outputs a detection signal 1790 (e.g., $V_{SNS1}$), and the output terminal 1786 outputs a detection signal 1792 (e.g., $V_{SNS2}$). As an example, the detection signal 762 includes the detection signal 1790 (e.g., $V_{SNS1}$) and the detection signal 1792 (e.g., $V_{SNS2}$).

According to some embodiments, the current sensing resistor 1760, the switch 1752 (e.g., SA), the coil 730, the switch 1758 (e.g., SD), and the current sensing resistor 1762 are connected in series. In some examples, one terminal of the current sensing resistor 1760 is connected to the input terminal 1772 of the current sampling amplifier 1770 and the input terminal 792 that receives the input voltage 612 (e.g., $V_{IN}$), and another terminal of the current sensing resistor 1760 is connected to the input terminal 1774 of the current sampling amplifier 1770 and one terminal of the switch 1752 (e.g., SA). For example, another terminal of the switch 1752 (e.g., SA) is connected to one terminal of the coil 730 and one terminal of the switch 1754 (e.g., SB) through a node 1732 (e.g., SW1). As an example, another terminal of the switch 1754 (e.g., SB) is biased to the ground voltage. In certain examples, one terminal of the current sensing resistor 1762 is connected to the input terminal 1784 of the current sampling amplifier 1780 and the output terminal 794 that outputs the output voltage 614 (e.g., $V_{OUT}$), and another terminal of the current sensing resistor 1762 is connected to the input terminal 1782 of the current sampling amplifier 1780 and one terminal of the switch 1758 (e.g., SD). For example, another terminal of the switch 1758 (e.g., SD) is connected to another terminal of the coil 730 and one terminal of the switch 1756 (e.g., SC) through a node 1734 (e.g., SW2). As an example, another terminal of the switch 1756 (e.g., SC) is biased to the ground voltage. In some examples, a coil current 1736 (e.g., $I_L$) flows through the coil 730 as shown in FIG. 17. For example, the current sensing resistor 1760 and/or the current sensing resistor 1762 allow the coil current 1736 (e.g., $I_L$) to flow through the current sensing resistor 1760 and/or the current sensing resistor 1762.

In certain embodiments, the control signal 782 is used to close or open the switch 1752 (e.g., SA), the control signal 784 is used to close or open the switch 1754 (e.g., SB), the control signal 786 is used to close or open the switch 1756 (e.g., SC), and the control signal 788 is used to close or open the switch 1758 (e.g., SD). For example, under certain condition, both the switch 1752 (e.g., SA) and the switch 1758 (e.g., SD) are closed, so that a current flows from the input terminal 792 to the output terminal 794 through the current sensing resistor 1760, the switch 1752 (e.g., SA), the coil 730, the switch 1758 (e.g., SD), and the current sensing resistor 1762. As an example, allowing both the switch 1752 (e.g., SA) and the switch 1758 (e.g., SD) to be closed at the same time reduces the average magnitude of the coil current 1736 (e.g., $I_L$) that flows through the coil 730 and also lowers the conduction loss.

As discussed above and further emphasized here, FIG. 9 is merely an example, which should not unduly limit the scope of the claims. One of ordinary skill in the art would recognize many variations, alternatives, and modifications. In certain examples, the modulation signal generator 910 receives the output voltage 614 (e.g., $V_{OUT}$) and the detection signal 762, which includes the detection signal 1790 (e.g., $V_{SNS1}$) and the detection signal 1792 (e.g., $V_{SNS2}$), and the modulation signal generator 910 generates the pulse-width-modulation signal 912 for the boost mode (e.g., PWM_BST) and the pulse-width-modulation signal 914 for the buck mode (e.g., PWM_BUK). For example, the voltage adder 980 receives the detection signal 1790 (e.g., $V_{SNS1}$) and the signal 981 (e.g., SLOPE_BST) and generates the voltage 951 (e.g., $V_{SUM\_BST}$) by adding the detection signal 1790 (e.g., $V_{SNS1}$) and the signal 981 (e.g., SLOPE_BST). As an example, the voltage subtractor 982 receives the detection signal 1792 (e.g., $V_{SNS2}$) and the signal 983 (e.g., SLOPE_BUK) and generates the voltage 961 (e.g., $V_{SUM\_BUK}$) by subtracting the signal 983 (e.g., SLOPE_BUK) from the detection signal 1792 (e.g., $V_{SNS2}$).

As discussed above, FIG. 17 is a simplified diagram showing certain components of the DC-to-DC voltage converter 610 as shown in FIG. 7 according to some embodiments of the present invention. For example, the DC-to-DC voltage converter 610 as shown in FIG. 7 includes certain components as shown in FIG. 17 and also certain components of the voltage controller 770 as shown in FIG. 9 and/or FIG. 11.

According to some embodiments, a voltage converter for converting an input voltage to an output voltage includes: a coil; multiple switches including one or more switches connected to the coil; a modulation signal generator configured to: receive the output voltage and one or more detection signals indicating a magnitude of a coil current flowing through the coil; and generate a first signal and a second signal based at least in part upon the output voltage and the one or more detection signals; and an operation mode controller configured to: receive the input voltage, the output voltage, the first signal, and the second signal; and generate one or more mode signals based at least in part upon the input voltage, the output voltage, the first signal, and the second signal; wherein the one or more mode signals indicate that the voltage converter operates in an operation mode selected from multiple operation modes. For example, the voltage converter is implemented according to at least FIG. 7 and/or FIG. 9.

As an example, the voltage converter further includes: a control signal generator configured to: receive the one or more mode signals; and generate multiple control signals based at least in part on the one or more mode signals; wherein the multiple control signals correspond to the operation mode selected from the multiple operation modes. For example, the multiple switches are configured to receive the multiple control signals to open or close each switch of the multiple switches. As an example, the input voltage is a first DC voltage; and the output voltage is a second DC voltage; wherein the first DC voltage and the second DC voltage are equal or not equal. For example, the voltage converter further includes: a current detector including one or more resistors and one or more amplifiers; wherein: the one or more resistors are configured to allow the coil current to flow through the one or more resistors; and the one or more amplifiers are coupled to the one or more resistors and configured to generate the one or more detection signals indicating the magnitude of the coil current.

As an example, The voltage converter of claim 1 wherein the multiple operation modes includes a first operation mode, a second operation mode, and a third operation mode. For example, the first operation mode is a boost mode; wherein in the boost mode, the output voltage is larger than the input voltage. As an example, the second operation mode is a buck mode; wherein in the buck mode, the output voltage is smaller than the input voltage. For example, in the third operation mode, the input voltage and the output voltage are approximately equal. As an example, in the third operation mode, the input voltage and the output voltage are equal.

For example, the modulation signal generator includes: a voltage adder configured to receive a first detection signal of the one or more detection signals and generate a first processed signal; and a voltage subtractor configured to receive a second detection signal of the one or more detection signals and generate a second processed signal. As an example, the one or more detection signals consist of one detection signal; and the first detection signal and the second detection signal are the same signal. For example, the one or more detection signals include two detection signals; and the first detection signal and the second detection signal are different signals. As an example, the modulation signal generator is further configured to generate the first signal and the second signal based at least in part upon the first processed signal and the second processed signal. For example, each signal of the first signal and the second signal is a pulse-width-modulation signal.

As an example, the one or more mode signals include a first mode signal, a second mode signal, a third mode signal, and a fourth mode signal; wherein each mode signal of the first mode signal, the second mode signal, the third mode signal, and the fourth mode signal is at a logic high level or a logic low level. For example, if the first mode signal is at the logic high level, the second mode signal is at the logic low level; and if the first mode signal is at the logic low level, the second mode signal is at the logic high level. As an example, the voltage converter of claim 16 wherein the operation mode controller is further configured to: determine a voltage ratio of the input voltage to the output voltage; and generate the first mode signal and the second mode signal based at least in part upon the voltage ratio. For example, the first signal is associated with a first duty cycle; and the operation mode controller is further configured to generate the third mode signal based at least in part upon the first duty cycle of the first signal. As an example, the second signal is associated with a second duty cycle; and the operation mode controller is further configured to generate the fourth mode signal based at least in part upon the second duty cycle of the second signal.

According to certain embodiments, a method for converting an input voltage to an output voltage, the method comprising: receiving the output voltage and one or more detection signals indicating a magnitude of a coil current flowing through a coil connected to one or more switches of multiple switches; generating a first signal and a second signal based at least in part upon the output voltage and the one or more detection signals; receiving the input voltage, the output voltage, the first signal, and the second signal; and generating one or more mode signals based at least in part upon the input voltage, the output voltage, the first signal, and the second signal; wherein the one or more mode signals indicate that the voltage converter operates in an operation mode selected from multiple operation modes. For example, the method is implemented according to at least FIG. 7 and/or FIG. 9.

As an example, the method further includes: receiving the one or more mode signals; and generating multiple control signals based at least in part on the one or more mode signals; wherein the multiple control signals correspond to the operation mode selected from the multiple operation modes. For example, the method further includes receiving the multiple control signals by the multiple switches to open or close each switch of the multiple switches.

As an example, the multiple operation modes includes a first operation mode, a second operation mode, and a third operation mode. For example, the first operation mode is a boost mode; wherein in the boost mode, the output voltage is larger than the input voltage. As an example, the second operation mode is a buck mode; wherein in the buck mode, the output voltage is smaller than the input voltage. For example, in the third operation mode, the input voltage and the output voltage are approximately equal. As an example, in the third operation mode, the input voltage and the output voltage are equal.

For example, the one or more mode signals include a first mode signal, a second mode signal, a third mode signal, and a fourth mode signal; wherein each mode signal of the first mode signal, the second mode signal, the third mode signal, and the fourth mode signal is at a logic high level or a logic low level. As an example, if the first mode signal is at the logic high level, the second mode signal is at the logic low level; and if the first mode signal is at the logic low level, the second mode signal is at the logic high level. For example, the generating one or more mode signals based at least in part upon the input voltage, the output voltage, the first signal, and the second signal includes: determining a voltage ratio of the input voltage to the output voltage; and generating the first mode signal and the second mode signal based at least in part upon the voltage ratio. As an example, the first signal is associated with a first duty cycle; and the generating one or more mode signals based at least in part upon the input voltage, the output voltage, the first signal, and the second signal includes generating the third mode signal based at least in part upon the first duty cycle of the first signal. For example, the second signal is associated with a second duty cycle; and the generating one or more mode signals based at least in part upon the input voltage, the output voltage, the first signal, and the second signal further includes generating the fourth mode signal based at least in part upon the second duty cycle of the second signal.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A voltage converter for converting an input voltage to an output voltage, the voltage converter comprising:
   a coil;
   multiple switches including one or more switches connected to the coil;
   a modulation signal generator configured to:
     receive the output voltage and one or more detection signals indicating a magnitude of a coil current flowing through the coil; and
     generate a first signal and a second signal based at least in part upon the output voltage and the one or more detection signals;
   an operation mode controller configured to:
     receive the input voltage, the output voltage, the first signal, and the second signal; and
     generate one or more mode signals based at least in part upon the input voltage, the output voltage, the first signal, and the second signal; and
   a control signal generator configured to:
     receive the one or more mode signals; and
     generate multiple control signals based at least in part on the one or more mode signals;
   wherein the one or more mode signals indicate that the voltage converter operates in an operation mode selected from multiple operation modes;
   wherein the multiple control signals correspond to the operation mode selected from the multiple operation modes.

2. The voltage converter of claim 1 wherein the multiple switches are configured to receive the multiple control signals to open or close each switch of the multiple switches.

3. The voltage converter of claim 1 wherein:
   the input voltage is a first DC voltage; and
   the output voltage is a second DC voltage.

4. The voltage converter of claim 1, and further comprising:
   a current detector including one or more resistors and one or more amplifiers;
   wherein:
     the one or more resistors are configured to allow the coil current to flow through the one or more resistors; and
     the one or more amplifiers are coupled to the one or more resistors and configured to generate the one or more detection signals indicating the magnitude of the coil current.

5. A voltage converter for converting an input voltage to an output voltage, the voltage converter comprising:
   a coil;
   multiple switches including one or more switches connected to the coil;

a modulation signal generator configured to:
  receive the output voltage and one or more detection signals indicating a magnitude of a coil current flowing through the coil; and
  generate a first signal and a second signal based at least in part upon the output voltage and the one or more detection signals; and
an operation mode controller configured to:
  receive the input voltage, the output voltage, the first signal, and the second signal; and
  generate one or more mode signals based at least in part upon the input voltage, the output voltage, the first signal, and the second signal;
wherein the one or more mode signals indicate that the voltage converter operates in an operation mode selected from multiple operation modes;
wherein the multiple operation modes include a first operation mode, a second operation mode, and a third operation mode.

6. The voltage converter of claim 5 wherein:
the first operation mode is a boost mode;
wherein in the boost mode, the output voltage is larger than the input voltage.

7. The voltage converter of claim 5 wherein:
the second operation mode is a buck mode;
wherein in the buck mode, the output voltage is smaller than the input voltage.

8. The voltage converter of claim 5 wherein in the third operation mode, the input voltage and the output voltage are approximately equal.

9. The voltage converter of claim 8 wherein in the third operation mode, the input voltage and the output voltage are equal.

10. A voltage converter for converting an input voltage to an output voltage, the voltage converter comprising:
a coil;
multiple switches including one or more switches connected to the coil;
a modulation signal generator configured to:
  receive the output voltage and one or more detection signals indicating a magnitude of a coil current flowing through the coil; and
  generate a first signal and a second signal based at least in part upon the output voltage and the one or more detection signals; and
an operation mode controller configured to:
  receive the input voltage, the output voltage, the first signal, and the second signal; and
  generate one or more mode signals based at least in part upon the input voltage, the output voltage, the first signal, and the second signal;
wherein the one or more mode signals indicate that the voltage converter operates in an operation mode selected from multiple operation modes;
wherein the modulation signal generator includes:
  a voltage adder configured to receive a first detection signal of the one or more detection signals and generate a first processed signal; and
  a voltage subtractor configured to receive a second detection signal of the one or more detection signals and generate a second processed signal.

11. The voltage converter of claim 10 wherein:
the one or more detection signals consist of one detection signal; and
the first detection signal and the second detection signal are the same signal.

12. The voltage converter of claim 10 wherein:
the one or more detection signals include two detection signals; and
the first detection signal and the second detection signal are different signals.

13. The voltage converter of claim 10 wherein the modulation signal generator is further configured to generate the first signal and the second signal based at least in part upon the first processed signal and the second processed signal.

14. The voltage converter of claim 1 wherein each signal of the first signal and the second signal is a pulse-width-modulation signal.

15. A voltage converter for converting an input voltage to an output voltage, the voltage converter comprising:
a coil;
multiple switches including one or more switches connected to the coil;
a modulation signal generator configured to:
  receive the output voltage and one or more detection signals indicating a magnitude of a coil current flowing through the coil; and
  generate a first signal and a second signal based at least in part upon the output voltage and the one or more detection signals; and
an operation mode controller configured to:
  receive the input voltage, the output voltage, the first signal, and the second signal; and
  generate one or more mode signals based at least in part upon the input voltage, the output voltage, the first signal, and the second signal;
wherein the one or more mode signals indicate that the voltage converter operates in an operation mode selected from multiple operation modes;
wherein:
  the one or more mode signals include a first mode signal, a second mode signal, a third mode signal, and a fourth mode signal;
  wherein each mode signal of the first mode signal, the second mode signal, the third mode signal, and the fourth mode signal is at a logic high level or a logic low level.

16. The voltage converter of claim 15 wherein:
if the first mode signal is at the logic high level, the second mode signal is at the logic low level; and
if the first mode signal is at the logic low level, the second mode signal is at the logic high level.

17. The voltage converter of claim 15 wherein the operation mode controller is further configured to:
determine a voltage ratio of the input voltage to the output voltage; and
generate the first mode signal and the second mode signal based at least in part upon the voltage ratio.

18. The voltage converter of claim 15 wherein:
the first signal is associated with a first duty cycle; and
the operation mode controller is further configured to generate the third mode signal based at least in part upon the first duty cycle of the first signal.

19. The voltage converter of claim 18 wherein:
the second signal is associated with a second duty cycle; and
the operation mode controller is further configured to generate the fourth mode signal based at least in part upon the second duty cycle of the second signal.

20. A method for converting an input voltage to an output voltage, the method comprising:

receiving the output voltage and one or more detection signals indicating a magnitude of a coil current flowing through a coil connected to one or more switches of multiple switches;

generating a first signal and a second signal based at least in part upon the output voltage and the one or more detection signals;

receiving the input voltage, the output voltage, the first signal, and the second signal;

generating one or more mode signals based at least in part upon the input voltage, the output voltage, the first signal, and the second signal;

receiving the one or more mode signals; and generating multiple control signals based at least in part on the one or more mode signals;

wherein the one or more mode signals indicate that a voltage converter operates in an operation mode selected from multiple operation modes;

wherein the multiple control signals correspond to the operation mode selected from the multiple operation modes.

21. The method of claim 20, and further comprising receiving the multiple control signals by the multiple switches to open or close each switch of the multiple switches.

22. A method for converting an input voltage to an output voltage, the method comprising:

receiving the output voltage and one or more detection signals indicating a magnitude of a coil current flowing through a coil connected to one or more switches of multiple switches;

generating a first signal and a second signal based at least in part upon the output voltage and the one or more detection signals;

receiving the input voltage, the output voltage, the first signal, and the second signal; and generating one or more mode signals based at least in part upon the input voltage, the output voltage, the first signal, and the second signal;

wherein the one or more mode signals indicate that a voltage converter operates in an operation mode selected from multiple operation modes;

wherein the multiple operation modes include a first operation mode, a second operation mode, and a third operation mode.

23. The method of claim 22 wherein:
the first operation mode is a boost mode;
wherein in the boost mode, the output voltage is larger than the input voltage.

24. The method of claim 22 wherein:
the second operation mode is a buck mode;
wherein in the buck mode, the output voltage is smaller than the input voltage.

25. The method of claim 22 wherein in the third operation mode, the input voltage and the output voltage are approximately equal.

26. The method of claim 25 wherein in the third operation mode, the input voltage and the output voltage are equal.

27. A method for converting an input voltage to an output voltage, the method comprising:

receiving the output voltage and one or more detection signals indicating a magnitude of a coil current flowing through a coil connected to one or more switches of multiple switches;

generating a first signal and a second signal based at least in part upon the output voltage and the one or more detection signals;

receiving the input voltage, the output voltage, the first signal, and the second signal; and generating one or more mode signals based at least in part upon the input voltage, the output voltage, the first signal, and the second signal;

wherein the one or more mode signals indicate that a voltage converter operates in an operation mode selected from multiple operation modes;

wherein:
the one or more mode signals include a first mode signal, a second mode signal, a third mode signal, and a fourth mode signal;
wherein each mode signal of the first mode signal, the second mode signal, the third mode signal, and the fourth mode signal is at a logic high level or a logic low level.

28. The method of claim 27 wherein:
if the first mode signal is at the logic high level, the second mode signal is at the logic low level; and
if the first mode signal is at the logic low level, the second mode signal is at the logic high level.

29. The method of claim 27 wherein the generating one or more mode signals based at least in part upon the input voltage, the output voltage, the first signal, and the second signal includes:
determining a voltage ratio of the input voltage to the output voltage; and
generating the first mode signal and the second mode signal based at least in part upon the voltage ratio.

30. The method of claim 27 wherein:
the first signal is associated with a first duty cycle; and
the generating one or more mode signals based at least in part upon the input voltage, the output voltage, the first signal, and the second signal includes generating the third mode signal based at least in part upon the first duty cycle of the first signal.

31. The method of claim 30 wherein:
the second signal is associated with a second duty cycle; and
the generating one or more mode signals based at least in part upon the input voltage, the output voltage, the first signal, and the second signal further includes generating the fourth mode signal based at least in part upon the second duty cycle of the second signal.

* * * * *